(12) United States Patent
Pereira et al.

(10) Patent No.: US 9,140,552 B2
(45) Date of Patent: Sep. 22, 2015

(54) USER DEFINED NAMES FOR DISPLAYING MONITORED LOCATION

(75) Inventors: Mindy Pereira, Mountain View, CA (US); Larry Chen, Oakland, CA (US); Matthew Hornyak, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 983 days.

(21) Appl. No.: 12/167,137

(22) Filed: Jul. 2, 2008

(65) Prior Publication Data

US 2010/0004857 A1    Jan. 7, 2010

(51) Int. Cl.

| | |
|---|---|
| G01C 21/00 | (2006.01) |
| G06F 9/46 | (2006.01) |
| G01S 1/00 | (2006.01) |
| G01S 5/02 | (2010.01) |
| H04W 64/00 | (2009.01) |
| H04L 29/08 | (2006.01) |
| H04W 4/02 | (2009.01) |
| H04W 4/04 | (2009.01) |
| H04W 4/18 | (2009.01) |

(52) U.S. Cl.
CPC ............... *G01C 21/00* (2013.01); *G01S 5/0252* (2013.01); *H04L 29/08657* (2013.01); *H04L 67/18* (2013.01); *H04W 4/02* (2013.01); *H04W 4/04* (2013.01); *H04W 4/18* (2013.01); *H04W 64/00* (2013.01)

(58) Field of Classification Search
USPC .......................... 701/213, 208–209, 300, 533; 455/456.3, 566, 414.1, 457, 414.2, 455/412.1, 456.6, 456.1, 461.1; 717/168; 705/8, 26; 342/357.31; 718/100; 715/744; 370/312, 432, 390
See application file for complete search history.

(56) References Cited

U.S. PATENT DOCUMENTS

| | | | |
|---|---|---|---|
| 4,279,021 A | 7/1981 | See et al. | |
| 4,415,065 A | 11/1983 | Sandstedt | |

(Continued)

FOREIGN PATENT DOCUMENTS

| | | |
|---|---|---|
| EP | 0149762 A1 | 7/1985 |
| EP | 0611239 A1 | 8/1994 |

(Continued)

OTHER PUBLICATIONS

Jing, J., et al., "Client Server Computing in Mobile Environments", ACM Computing Surveys, (Jul. 1999), pp. 117-159, vol. 31, Issue 2, ACM Press. cited by other.*

(Continued)

*Primary Examiner* — Cuong H Nguyen
(74) *Attorney, Agent, or Firm* — Norton Rose Fulbright US LLP

(57) ABSTRACT

A user's location may be tracked by tracking a device associated with the user. The user's location may be published (e.g. on a website) using a user defined name or some other name that is not related to the coordinates of the location based on the tracked location of the device. If published to a website, the name may be uploaded to the website in a user-editable area of the website, which area may or may not be directed to tracking the location of the user. The device may also be configured to trigger reminders based on whether the device is leaving an area and/or based on whether the device is approaching a location based on the location's membership in a class of locations (e.g. approaching a grocery store).

17 Claims, 5 Drawing Sheets

(56) References Cited

U.S. PATENT DOCUMENTS

| | | |
|---|---|---|
| 4,587,630 A | 5/1986 | Straton et al. |
| 4,725,694 A | 2/1988 | Auer et al. |
| 4,764,770 A | 8/1988 | Church |
| 4,887,212 A | 12/1989 | Zamora et al. |
| 4,892,981 A | 1/1990 | Soloway et al. |
| 4,907,290 A | 3/1990 | Crompton |
| 4,916,441 A | 4/1990 | Gombrich |
| 5,010,547 A | 4/1991 | Johnson et al. |
| 5,012,219 A | 4/1991 | Henry |
| D320,598 S | 10/1991 | Auerbach et al. |
| 5,067,164 A | 11/1991 | Denker et al. |
| 5,075,684 A | 12/1991 | DeLuca |
| 5,101,439 A | 3/1992 | Kiang |
| 5,218,188 A | 6/1993 | Hanson |
| 5,227,614 A | 7/1993 | Danielson et al. |
| 5,333,266 A | 7/1994 | Boaz et al. |
| 5,334,824 A | 8/1994 | Martinez |
| 5,335,276 A | 8/1994 | Thompson et al. |
| 5,336,001 A | 8/1994 | Lichtenberg |
| 5,345,615 A | 9/1994 | Garofalo |
| 5,357,065 A | 10/1994 | Mitamura et al. |
| 5,359,317 A | 10/1994 | Gomez et al. |
| 5,379,057 A | 1/1995 | Clough et al. |
| 5,392,447 A | 2/1995 | Schlack et al. |
| 5,394,140 A | 2/1995 | Wong et al. |
| D359,920 S | 7/1995 | Sakamoto |
| 5,430,436 A | 7/1995 | Fennell |
| 5,465,401 A | 11/1995 | Thompson |
| 5,494,363 A | 2/1996 | Hochgesang |
| 5,503,484 A | 4/1996 | Louis |
| 5,539,317 A | 7/1996 | Janning |
| 5,594,796 A | 1/1997 | Grube et al. |
| 5,612,682 A | 3/1997 | DeLuca et al. |
| 5,650,776 A | 7/1997 | Mitchell et al. |
| 5,699,244 A | 12/1997 | Clark et al. |
| 5,705,995 A | 1/1998 | Laflin et al. |
| 5,708,655 A | 1/1998 | Toth et al. |
| 5,742,894 A | 4/1998 | Jambhekar et al. |
| 5,779,030 A | 7/1998 | Ikegami et al. |
| 5,812,651 A | 9/1998 | Kaplan |
| 5,813,778 A | 9/1998 | Shih |
| 5,850,187 A | 12/1998 | Carrender et al. |
| 5,852,187 A | 12/1998 | Thorner et al. |
| 5,875,434 A | 2/1999 | Matsuoka et al. |
| 5,884,168 A | 3/1999 | Kolev et al. |
| 5,901,211 A | 5/1999 | Dean et al. |
| 5,901,358 A | 5/1999 | Petty et al. |
| 5,903,852 A | 5/1999 | Schaupp et al. |
| 5,905,863 A | 5/1999 | Knowles et al. |
| 5,917,906 A | 6/1999 | Thornton |
| 5,918,159 A | 6/1999 | Fomukong et al. |
| 5,936,614 A | 8/1999 | An et al. |
| 5,938,721 A | 8/1999 | Dussell et al. |
| 5,941,648 A | 8/1999 | Robinson et al. |
| 5,958,006 A | 9/1999 | Eggleston et al. |
| 5,966,652 A | 10/1999 | Coad et al. |
| 5,974,330 A | 10/1999 | Negishi |
| D416,256 S | 11/1999 | Griffin et al. |
| 6,016,476 A | 1/2000 | Maes et al. |
| 6,038,547 A | 3/2000 | Casto |
| 6,044,275 A | 3/2000 | Boltz et al. |
| 6,047,579 A | 4/2000 | Schmitz |
| 6,055,510 A | 4/2000 | Henrick et al. |
| 6,058,304 A | 5/2000 | Callaghan et al. |
| 6,061,346 A | 5/2000 | Nordman |
| 6,061,561 A | 5/2000 | Alanara et al. |
| 6,085,101 A | 7/2000 | Jain et al. |
| 6,101,531 A | 8/2000 | Eggleston et al. |
| 6,104,291 A | 8/2000 | Beauvillier et al. |
| 6,111,538 A | 8/2000 | Schuchman et al. |
| 6,151,507 A | 11/2000 | Laiho et al. |
| 6,157,630 A | 12/2000 | Adler et al. |
| 6,166,342 A | 12/2000 | Chou |
| 6,177,905 B1 | 1/2001 | Welch |
| 6,182,010 B1 | 1/2001 | Berstis |
| 6,182,221 B1 | 1/2001 | Hsu et al. |
| 6,198,053 B1 | 3/2001 | Chou |
| 6,226,362 B1 | 5/2001 | Gerszberg et al. |
| 6,230,197 B1 | 5/2001 | Beck et al. |
| 6,243,689 B1 | 6/2001 | Norton |
| 6,246,376 B1 | 6/2001 | Bork et al. |
| 6,256,631 B1 | 7/2001 | Malcolm |
| 6,259,405 B1 | 7/2001 | Stewart et al. |
| 6,259,931 B1 | 7/2001 | Singh |
| 6,278,442 B1 | 8/2001 | Griffin et al. |
| 6,295,372 B1 | 9/2001 | Hawkins et al. |
| 6,297,737 B1 | 10/2001 | Irvin |
| 6,304,636 B1 | 10/2001 | Goldberg et al. |
| 6,304,753 B1 | 10/2001 | Hartmaier |
| 6,307,919 B1 | 10/2001 | Yoked |
| 6,310,609 B1 | 10/2001 | Morgenthaler |
| 6,313,745 B1 | 11/2001 | Suzuki |
| 6,330,589 B1 | 12/2001 | Kennedy |
| 6,333,973 B1 | 12/2001 | Smith et al. |
| 6,346,881 B1 | 2/2002 | Davidson |
| 6,346,952 B1 | 2/2002 | Shtivelman |
| D454,349 S | 3/2002 | Makidera et al. |
| 6,360,101 B1 * | 3/2002 | Irvin ................ 455/456.6 |
| 6,363,349 B1 | 3/2002 | Urs et al. |
| 6,369,482 B1 | 4/2002 | Rink, Jr. et al. |
| 6,370,018 B1 | 4/2002 | Miller, Jr. et al. |
| D456,794 S | 5/2002 | Laverick et al. |
| 6,389,290 B1 | 5/2002 | Kikinis et al. |
| 6,396,482 B1 | 5/2002 | Griffin et al. |
| 6,404,761 B1 | 6/2002 | Snelling et al. |
| 6,415,138 B2 | 7/2002 | Sirola et al. |
| 6,424,845 B1 | 7/2002 | Emmoft et al. |
| D462,354 S | 9/2002 | Kimbre et al. |
| 6,452,588 B2 | 9/2002 | Griffin et al. |
| 6,456,234 B1 | 9/2002 | Johnson |
| D464,962 S | 10/2002 | MacGregor et al. |
| 6,463,154 B1 | 10/2002 | Patel |
| 6,487,180 B1 | 11/2002 | Borgstahl et al. |
| D466,714 S | 12/2002 | Grosfillex |
| 6,489,950 B1 | 12/2002 | Griffin et al. |
| D468,714 S | 1/2003 | Maruska et al. |
| D469,749 S | 2/2003 | Kim |
| D470,842 S | 2/2003 | Bhatia et al. |
| 6,516,202 B1 | 2/2003 | Hawkins et al. |
| D471,559 S | 3/2003 | De Saulles |
| 6,532,368 B1 | 3/2003 | Hild et al. |
| 6,542,750 B2 | 4/2003 | Hendrey et al. |
| 6,553,236 B1 * | 4/2003 | Dunko et al. ........ 455/456.1 |
| 6,560,461 B1 | 5/2003 | Fomukong et al. |
| D477,597 S | 7/2003 | Laverick et al. |
| 6,601,093 B1 | 7/2003 | Peters |
| 6,611,254 B1 | 8/2003 | Griffin et al. |
| 6,611,255 B2 | 8/2003 | Griffin et al. |
| 6,618,593 B1 | 9/2003 | Drutman et al. |
| 6,628,938 B1 | 9/2003 | Rachabathuni et al. |
| 6,630,944 B1 | 10/2003 | Kakuta et al. |
| 6,633,761 B1 | 10/2003 | Singhal et al. |
| 6,658,254 B1 | 12/2003 | Purdy et al. |
| 6,671,735 B1 | 12/2003 | Bender |
| 6,681,108 B1 | 1/2004 | Terry et al. |
| 6,684,068 B1 | 1/2004 | Tikka et al. |
| 6,687,608 B2 | 2/2004 | Sugimoto et al. |
| 6,687,763 B2 | 2/2004 | Kimura et al. |
| D488,478 S | 4/2004 | Laverick et al. |
| 6,731,613 B1 | 5/2004 | Provance |
| 6,751,453 B2 | 6/2004 | Schemers et al. |
| 6,757,718 B1 | 6/2004 | Halverson et al. |
| 6,763,235 B2 | 7/2004 | Imai |
| 6,772,331 B1 | 8/2004 | Hind et al. |
| 6,778,644 B1 | 8/2004 | Jenkins et al. |
| 6,799,033 B2 | 9/2004 | Kanefsky |
| 6,831,563 B1 | 12/2004 | Contractor |
| 6,832,178 B1 | 12/2004 | Fernandez et al. |
| 6,847,823 B2 | 1/2005 | Lehikoinen et al. |
| 6,867,763 B2 | 3/2005 | Griffin et al. |
| 6,870,828 B1 | 3/2005 | Giordano, III |
| 6,873,317 B1 | 3/2005 | Griffin et al. |
| 6,885,362 B2 | 4/2005 | Suomela |
| 6,891,529 B2 | 5/2005 | LaDouceur et al. |

(56) References Cited

U.S. PATENT DOCUMENTS

| | | |
|---|---|---|
| 6,907,134 B1 | 6/2005 | Yamada et al. |
| 6,919,879 B2 | 7/2005 | Griffin et al. |
| 6,920,328 B2 | 7/2005 | Wollrab |
| 6,934,664 B1 | 8/2005 | Webb et al. |
| 6,938,067 B2 | 8/2005 | Hershenson |
| 6,941,270 B1 | 9/2005 | Hannula |
| 6,981,223 B2 | 12/2005 | Becker et al. |
| 6,982,962 B1 | 1/2006 | Lunsford et al. |
| 7,006,817 B2 | 2/2006 | Awada et al. |
| 7,007,239 B1 | 2/2006 | Hawkins et al. |
| 7,016,539 B1 * | 3/2006 | Silver et al. ............... 382/216 |
| 7,017,047 B2 * | 3/2006 | Vanska et al. ............. 713/193 |
| D518,820 S | 4/2006 | Hawkins et al. |
| D518,825 S | 4/2006 | Hawkins et al. |
| D519,502 S | 4/2006 | Hawkins et al. |
| 7,028,263 B2 | 4/2006 | Maguire |
| 7,035,382 B1 | 4/2006 | Shin et al. |
| 7,054,441 B2 | 5/2006 | Pletikosa |
| 7,061,403 B2 | 6/2006 | Fux |
| 7,084,758 B1 | 8/2006 | Cole |
| 7,103,010 B2 | 9/2006 | Melideo |
| 7,103,370 B1 * | 9/2006 | Creemer ................ 455/456.3 |
| 7,103,388 B2 | 9/2006 | Scott |
| 7,164,885 B2 | 1/2007 | Jonsson et al. |
| 7,192,235 B2 | 3/2007 | Blight et al. |
| 7,212,827 B1 | 5/2007 | Veschl |
| 7,266,379 B2 | 9/2007 | Blight et al. |
| 7,266,584 B2 | 9/2007 | Mullen et al. |
| 7,274,299 B2 | 9/2007 | Osman |
| 7,328,242 B1 | 2/2008 | McCarthy et al. |
| 7,336,964 B2 | 2/2008 | Casey |
| 7,353,034 B2 | 4/2008 | Haney |
| 7,360,248 B1 | 4/2008 | Kanevsky et al. |
| 7,383,307 B2 | 6/2008 | Kirkland et al. |
| 7,421,690 B2 | 9/2008 | Forstall et al. |
| 7,424,447 B2 * | 9/2008 | Fuzell-Casey et al. ......... 705/26 |
| 7,583,972 B2 | 9/2009 | Clipsham |
| 7,602,756 B2 * | 10/2009 | Gu et al. .................. 370/338 |
| 7,613,427 B2 | 11/2009 | Blight et al. |
| 7,613,428 B2 | 11/2009 | Blight et al. |
| 7,657,281 B2 * | 2/2010 | Eibye ...................... 455/550.1 |
| 7,672,681 B1 | 3/2010 | Beyer, Jr. |
| 7,805,719 B2 * | 9/2010 | O'Neill ...................... 717/168 |
| 7,856,248 B1 * | 12/2010 | Fujisaki .................... 455/556.1 |
| 7,890,089 B1 * | 2/2011 | Fujisaki .................... 455/414.2 |
| 7,890,136 B1 * | 2/2011 | Fujisaki .................... 455/556.1 |
| 7,912,480 B2 | 3/2011 | Moosavi et al. |
| 8,073,431 B2 | 12/2011 | Blight et al. |
| 8,213,389 B2 * | 7/2012 | Bush et al. ................ 370/334 |
| 8,401,032 B2 * | 3/2013 | Hundscheidt et al. ....... 370/432 |
| 2001/0006889 A1 | 7/2001 | Kraft |
| 2001/0021649 A1 | 9/2001 | Kinnunen et al. |
| 2001/0025309 A1 | 9/2001 | MacLeod et al. |
| 2002/0010617 A1 | 1/2002 | Hamaguchi et al. |
| 2002/0016735 A1 | 2/2002 | Runge et al. |
| 2002/0019243 A1 | 2/2002 | Zhang et al. |
| 2002/0019584 A1 | 2/2002 | Schulze et al. |
| 2002/0036991 A1 | 3/2002 | Inoue |
| 2002/0044136 A1 | 4/2002 | Griffin et al. |
| 2002/0061031 A1 | 5/2002 | Sugar et al. |
| 2002/0069218 A1 | 6/2002 | Sull et al. |
| 2002/0078075 A1 | 6/2002 | Colson et al. |
| 2002/0086680 A1 | 7/2002 | Hunzinger |
| 2002/0115453 A1 | 8/2002 | Poulin et al. |
| 2002/0115476 A1 | 8/2002 | Padawer et al. |
| 2002/0136184 A1 | 9/2002 | Liang et al. |
| 2002/0147614 A1 | 10/2002 | Doerr et al. |
| 2002/0147717 A1 | 10/2002 | Barros et al. |
| 2002/0184331 A1 | 12/2002 | Blight et al. |
| 2002/0184418 A1 | 12/2002 | Blight |
| 2002/0190957 A1 | 12/2002 | Lee et al. |
| 2002/0194498 A1 | 12/2002 | Blight et al. |
| 2003/0005048 A1 | 1/2003 | Risalvato |
| 2003/0022682 A1 | 1/2003 | Weston et al. |
| 2003/0033582 A1 | 2/2003 | Klein et al. |
| 2003/0052907 A1 | 3/2003 | Rekimoto |
| 2003/0054846 A1 | 3/2003 | Parry |
| 2003/0065788 A1 | 4/2003 | Salomaki |
| 2003/0070176 A1 | 4/2003 | Parker et al. |
| 2003/0087602 A1 | 5/2003 | Kammer |
| 2003/0114174 A1 | 6/2003 | Walsh et al. |
| 2003/0149527 A1 | 8/2003 | Sikila |
| 2004/0093224 A1 * | 5/2004 | Vanska et al. .................. 705/1 |
| 2004/0137884 A1 | 7/2004 | Engstrom et al. |
| 2004/0166829 A1 | 8/2004 | Nakae et al. |
| 2004/0176107 A1 | 9/2004 | Chadha |
| 2004/0185883 A1 | 9/2004 | Rukman |
| 2004/0193499 A1 | 9/2004 | Ortiz et al. |
| 2004/0203847 A1 | 10/2004 | Knauerhase et al. |
| 2004/0207522 A1 | 10/2004 | McGee et al. |
| 2004/0218609 A1 | 11/2004 | Foster et al. |
| 2004/0233159 A1 | 11/2004 | Badarneh |
| 2004/0235464 A1 | 11/2004 | Korkalo et al. |
| 2004/0239639 A1 | 12/2004 | Stavely et al. |
| 2004/0249776 A1 * | 12/2004 | Horvitz et al. ................ 706/21 |
| 2004/0266398 A1 | 12/2004 | Adamczyk et al. |
| 2005/0012611 A1 | 1/2005 | Osman |
| 2005/0043036 A1 | 2/2005 | Ioppe et al. |
| 2005/0043037 A1 | 2/2005 | Ioppe et al. |
| 2005/0097189 A1 | 5/2005 | Kashi |
| 2005/0220064 A1 * | 10/2005 | Hundscheidt et al. ........ 370/342 |
| 2005/0227711 A1 | 10/2005 | Orwant et al. |
| 2006/0030339 A1 | 2/2006 | Zhovnirovsky et al. |
| 2006/0034434 A1 | 2/2006 | Kashi |
| 2006/0061488 A1 | 3/2006 | Dunton |
| 2006/0089792 A1 | 4/2006 | Manber et al. |
| 2006/0095331 A1 * | 5/2006 | O'Malley et al. .............. 705/22 |
| 2006/0095348 A1 | 5/2006 | Jones et al. |
| 2006/0230137 A1 * | 10/2006 | Gare et al. ................ 709/224 |
| 2006/0265508 A1 * | 11/2006 | Angel et al. ............... 709/230 |
| 2006/0291434 A1 * | 12/2006 | Gu et al. .................. 370/338 |
| 2007/0005715 A1 | 1/2007 | LeVasseur et al. |
| 2007/0036286 A1 | 2/2007 | Champlin et al. |
| 2007/0060174 A1 | 3/2007 | Newton et al. |
| 2007/0077889 A1 | 4/2007 | Blight et al. |
| 2007/0091861 A1 | 4/2007 | Gupta et al. |
| 2007/0149208 A1 | 6/2007 | Syrbe et al. |
| 2007/0185980 A1 | 8/2007 | Abraham et al. |
| 2007/0192277 A1 | 8/2007 | Jackson |
| 2007/0198432 A1 * | 8/2007 | Pitroda et al. ................ 705/64 |
| 2007/0200732 A1 | 8/2007 | Bachmaier |
| 2007/0202886 A1 | 8/2007 | Dhebri et al. |
| 2007/0202887 A1 * | 8/2007 | Counts et al. ............. 455/456.1 |
| 2007/0207733 A1 | 9/2007 | Wong et al. |
| 2007/0225004 A1 | 9/2007 | Tang et al. |
| 2007/0243862 A1 * | 10/2007 | Coskun et al. ................ 455/418 |
| 2007/0271367 A1 | 11/2007 | Yardeni et al. |
| 2007/0298571 A1 | 12/2007 | Blight et al. |
| 2008/0020786 A1 | 1/2008 | Smith et al. |
| 2008/0021637 A1 | 1/2008 | Staton et al. |
| 2008/0036653 A1 | 2/2008 | Huston |
| 2008/0037721 A1 | 2/2008 | Yao et al. |
| 2008/0045173 A1 | 2/2008 | Park et al. |
| 2008/0045234 A1 * | 2/2008 | Reed .......................... 455/456.1 |
| 2008/0045236 A1 | 2/2008 | Nahon et al. |
| 2008/0104173 A1 | 5/2008 | Wilcox et al. |
| 2008/0125102 A1 | 5/2008 | Abel et al. |
| 2008/0134088 A1 * | 6/2008 | Tse et al. ...................... 715/810 |
| 2008/0139114 A1 | 6/2008 | Ranganathan |
| 2008/0167078 A1 * | 7/2008 | Eibye ............................ 455/566 |
| 2008/0172462 A1 | 7/2008 | Carrer et al. |
| 2008/0177994 A1 * | 7/2008 | Mayer ............................ 713/2 |
| 2008/0195312 A1 * | 8/2008 | Aaron et al. ................. 701/209 |
| 2008/0254811 A1 | 10/2008 | Stewart |
| 2008/0281696 A1 * | 11/2008 | Whitehead ..................... 705/14 |
| 2009/0005018 A1 * | 1/2009 | Forstall et al. ............. 455/414.1 |
| 2009/0061870 A1 | 3/2009 | Finkelstein et al. |
| 2009/0143056 A1 | 6/2009 | Tang et al. |
| 2009/0157658 A1 * | 6/2009 | Bonev et al. ..................... 707/5 |
| 2009/0157693 A1 * | 6/2009 | Palahnuk ........................ 707/10 |
| 2009/0158173 A1 * | 6/2009 | Palahnuk et al. .............. 715/753 |
| 2009/0158186 A1 * | 6/2009 | Bonev et al. ................... 715/769 |
| 2009/0158200 A1 * | 6/2009 | Palahnuk et al. .............. 715/781 |
| 2009/0258660 A1 * | 10/2009 | Bush et al. ................ 455/456.5 |

(56) References Cited

U.S. PATENT DOCUMENTS

| | | | |
|---|---|---|---|
| 2009/0298511 A1 | 12/2009 | Paulson | |
| 2009/0327908 A1* | 12/2009 | Hayton | 715/744 |
| 2009/0327909 A1* | 12/2009 | Hayton | 715/744 |
| 2010/0004005 A1 | 1/2010 | Pereira et al. | |
| 2011/0053605 A1 | 3/2011 | Carpio et al. | |

FOREIGN PATENT DOCUMENTS

| | | | |
|---|---|---|---|
| EP | 1104151 A2 | | 5/2001 |
| EP | 1117185 A1 | | 7/2001 |
| EP | PCT/EP03/04731 | * | 6/2003 |
| EP | 1 494 488 A1 | | 1/2005 |
| GB | 0716548.3 | * | 8/2007 |
| KR | 2001 0109963 | | 12/2001 |
| KR | 2005 0087189 | | 8/2005 |
| KR | 2005 0095477 | | 9/2005 |
| KR | 2006 0008100 | | 1/2006 |
| WO | WO03/094534 | * | 11/2003 |
| WO | WO 2007/118125 | | 10/2007 |
| WO | 2008030967 A2 | | 3/2008 |
| WO | WO 2008/027836 A2 | | 3/2008 |

OTHER PUBLICATIONS

Hadjiefthymiades, S. et al., "ESW4: enhanced scheme for WWW computing in wireless communication environments", ACM SIGCOMM Computer Communication Review (Oct. 1999), pp. 24-35, vol. 29, Issue 5, ACM Press. cited by other.*

Sevanto, J. et al., "Introducing quality-of-service and traffic classes in wireless mobile networks", Proceedings of the 1st ACM International workshop on Wireless mobile multimedia (1999), pp. 21-29, ACM Press. cited by other.*

Fasbender, A. et al., "Any Network, Any Terminal, Anywhere", IEEE Personal Communications (Apr. 1999), pp. 22-30, IEEE Press. cited by other.*

Digital Cellular Telecommunications System (Phase 2+) At Command Set for GSM Mobile Equipment (ME) (GSM 07.07 verson 7.4.0 Release 1998), ETSI TS 100 916 V7.4.0 (Nov. 1999), 126 pages. cited by other.*

UWB in Heterogeneous Access Networks: location-aware services; Cluzeaud, P.; Bucaille, I.; Sierra, A.; Chóliz, J.; Positioning Navigation and Communication (WPNC), 2010 7th Workshop on; Digital Object Identifier: 10.1109/WPNC.2010.5653619 Publication Year: 2010, pp. 257-263.*

A Hybrid Mobile-based Patient Location Tracking System for Personal Healthcare Applications; Chew, S.H.; Chong, P.A.; Gunawan, E.; Goh, K.W.; Kim, Y.; Soh, C.B.; Engineering in Medicine and Biology Society, 2006. EMBS '06. 28th Annual Inter. Conf. of the IEEE; Digital Object Identifier: 10.1109/IEMBS.2006.259579; Pub. 2006, pp. 5188-5191.*

A new naming and name resolution mapping system; Fuhong Lin; Jianyin Zhang; Qing Yu; Changjia Chen; Hongke Zhang; Informatics in Control, Automation and Robotics (CAR), 2010 2nd International Asia Conference on; vol. 3 Digital Object Identifier: 10.1109/CAR. 2010.5456713; Publication Year: 2010, pp. 377-380.*

Secure Access Control for Location-Based Applications in WLAN Systems; YounSun Cho; Lichun Bao; Mobile Adhoc and Sensor Systems (MASS), 2006 IEEE International Conference on; Digital Object Identifier: 10.1109/MOBHOC.2006.278664 Publication Year: 2006, pp. 852-857.*

GeoServ: A Distributed Urban Sensing Platform; Jong Hoon Ahnn; Uichin Lee; Hyun Jin Moon; Cluster, Cloud and Grid Computing (CCGrid), 2011 11th IEEE/ACM International Symposium on; Digital Object Identifier: 10.1109/CCGrid.2011.10 Publication Year: 2011, pp. 164-173.*

Nodits: Position Triggered Information and Messages; Gilbertson, P.; Edwards, R.; Coulton, P.; Consumer Electronics, 2006. ISCE '06. 2006 IEEE Tenth International Symposium on; Digital Object Identifier: 10.1109/ISCE.2006.1689510 Publication Year: 2006, pp. 1-3.*

Implementing location based information/advertising for existing mobile phone users in indoor/urban environments Rashid, O.; Coulton, P.; Edwards, R.; Mobile Business, 2005. ICMB 2005. International Conference on; Digital Object Identifier: 10.1109/ICMB.2005.45; Publication Year: 2005, pp. 377-383.*

An agent based mobile phone groupware system using location information; Koyama, A.; Barolli, L.; Takami, S.; Kamibayashi, N.; Shiratori, N.; Database and Expert Systems Applications, 2002. Proceedings. 13th International Workshop on; Digital Object Identifier: 10.1109/DEXA.2002.1045873; Publication Year: 2002, pp. 37-41.*

Track me! a web based location tracking and analysis system for smart phone users; Bayir, M.A.; Demirbas, M.; Cosar, A.;Computer and Information Sciences, 2009. ISCIS 2009. 24th International Symposium on; Digital Object Identifier: 10.1109/ISCIS.2009. 5291863; Publication Year: 2009, pp. 117-122.*

Energy efficient scheduling in 4G smart phones for Mobile Hotspot application; Keshav, K.; Indukuri, V.R.; Venkataram, P. Communications (NCC), 2012 National Conference on; Digital Object Identifier: 10.1109/NCC.2012.6176904 Publication Year: 2012, pp. 1-5.*

A case for MANET-aware content centric networking of smartphones; Sharma, P.; Souza, D.; Fiore, E.; Gottschalk, J.; Marquis, D. World of Wireless, Mobile and Multimedia Networks (WoWMoM), 2012 IEEE International Symposium on a Digital Object Identifier: 10.1109/WoWMoM.2012.6263714; Publication Year: 2012, pp. 1-6.*

Location based reconfigurable cell site diversity techniques for LED-ID system; Uddin, M.S.; Yeong Min Jang; ICT Convergence (ICTC), 2011 International Conference on; Digital Object Identifier: 10.1109/ICTC.2011.6082653 Publication Year: 2011, pp. 523-526.*

First responder location and tracking using Synthetic Aperture Navigation; Haas, Lin; Harlacher, Marc; Position Location and Navigation Symposium (PLANS), 2010 IEEE/ION; Digital Object Identifier: 10.1109/PLANS.2010.5507250 Publication Year: 2010, pp. 483-487.*

Zone Services—An Approach for Location-Based Data Collection; Weib, D.; Kramer, I.; Treu, G.; Kupper, A.; E-Commerce Technology, 2006. The 8th IEEE International Conference on and Enterprise Computing, E-Commerce, and E-Services, The 3rd IEEE Inter. Conf.; Digital Object Identifier: 10.1109/CEC-EEE.2006.100; Pub. Year: 2006, pp. 79.*

Beyond in and UPT-a personal communications support system based on TMN concepts; Eckardt, T.O.; Magedanz, T.; Popescu-Zeletin, R.; Selected Areas in Communications, IEEE Journal on; vol. 15, Issue: 7; Digital Object Identifier: 10.1109/49.622913 Publication Year: 1997, pp. 1308-1314.*

MyPULSE: Mobile Yellow Pages with user interest and Location Sensing Ensemble; Debroy, S.; De, S.; Das, S.; Chakbraborty, A.; Das, P.K.; Paul, S.; TENCON 2008—2008 IEEE Region 10 Conf.; Digital Object Identifier: 10.1109/TENCON.2008.4766611 Publication Year: 2008, pp. 1-6.*

MyPULSE: Mobile Yellow Pages with user interest and Location Sensing Ensemble; Debroy, S.; De, S.; Das, S.; Chakbraborty, A.; Das, P.K.; Paul, S.; TENCON 2008—2008 IEEE Region 10 Conference; DOI: 10.1109/TENCON.2008.4766611 Publication Year: 2008, pp. 1-6.*

LOC: Location-aware opportunistic content forwarding using direction vectors; Ashraf Khan, S.K.; Loo, J.; Azam, M.A.; Sardar, H.; Adeel, M.; Computers & Informatics (ISCI), 2013 IEEE Symposium on; DOI: 10.1109/ISC1.2013.6612400 Publication Year: 2013, pp. 184-189.*

Restructuring multilingual web sites; Tonella, P.; Ricca, F.; Pianta, E.; Girardi, C.; Software Maintenance, 2002. Proceedings. International Conference on; DOI: 10.1109/ICSM.2002.1167784; Publication Year: 2002, pp. 290-299.*

High-efficiency and well-integrity method for dynamic acquisition of GNSS location information; Jie Qin; Jianping Xing; Yongzhi Wang; Guojun Huang; Lingguo Meng; Signal Processing Systems (ICSPS), 2010 2nd International Conference on vol. 1; DOI: 10.1109/ICSPS. 2010.5555549; Publication Year: 2010, pp. V1-520-V1-524.*

Geolocation on the iPhone by automatic street sign reading; Oosterman, J.; Green, R.; Image and Vision Computing New Zealand (IVCNZ), 2010 25th International Conference of; DOI: 10.1109/IVCNZ.2010.6148877; Publication Year: 2010, pp. 1-6.*

(56) References Cited

OTHER PUBLICATIONS

Naming and Addressing in a Computer-Based Mail Environment; Schicker, P.; Communications, IEEE Transactions on vol. 30, Issue: 1, Part: 1; DOI: 10.1 109/TCOM.1982.1095355; Publication Year: 1982, pp. 46-52.*

Ontology based location reasoning method using smart phone data; Sang II Kim; Hwa Sung Kim; Information Networking (ICOIN), 2015 International Conference on; DOI: 10.1109/ICOIN.2015.7057957; Publication Year: 2015, pp. 509-514.*

Estimating users' home and work locations leveraging large-scale crowd-sourced smartphone data; Hao Liu; Yuezhi Zhou; Yaoxue Zhang; Communications Magazine, IEEE; vol. 53, Issue: 3; DOI: 10.1109/MCOM.2015.7060485; Publication Year: 2015, pp. 71-79.*

Secondary User Authentication Based on Mobile Devices Location; Min-Hsao Chen; Chung-Han Chen; Networking, Architecture and Storage (NAS), 2010 IEEE Fifth International Conference on; DOI: 10.1109/NAS.2010.56; Publication Year: 2010, pp. 277-281.*

Location-based personalized social media service for the Smart Phone: Distributed social contents sharings; Jung-Tae Kim; Jong-Hoon Lee; Hoon-Ki Lee; Eui-Hyun Paik; Internet Technology and Secured Transactions (ICITST), 2011 International Conference for; Publication Year: 2011, pp. 655-659.*

Track me! a web based location tracking and analysis system for smart phone users; Bayir, M.A.; Demirbas, M.; Cosar, A. Computer and Information Sciences, 2009. ISCIS 2009. 24th International Symposium on; DOI: 10.1109/ISCIS.2009.5291863 Publication Year: 2009, pp. 117-122.*

A Unique Global Mobile Network Service Tracker and User Centric Data Analyser; Bilal, M.; Awan, I.; Mockford, S.; e-Yar, A. Broadband, Wireless Computing, Communication and Applications (BWCCA), 2012 Seventh International Conference on DOI: 10.1109/BWCCA.2012.94; Publication Year: 2012, pp. 534-539.*

U.S. Appl. No. 12/127,612, filed May 27, 2008, Paulson.

U.S. Appl. No. 12/510,002, filed Jul. 27, 2009, Palm, Inc.

International Search Report and Written Opinion from International Application No. PCT/US2009/045387 dated Feb. 17, 2010, 8 pages.

"New Riverside University Dictionary", published by The Riverside Publishing Company, Copyright 1984 by Houghton Mifflin Company, 3 pages.

Notice of Allowance for U.S. Appl. No. 11/706,872, mail date Dec. 27, 2010, 7 pages.

Office Action for U.S. Appl. No. 11/706,872, mail date Apr. 26, 2010, 8 pages.

Office Action for U.S. Appl. No. 11/823,850, mail date Jul. 21, 2010, 17 pages.

Office Action for U.S. Appl. No. 11/706,872, mail date Aug. 5, 2010, 9 pages.

Office Action for U.S. Appl. No. 12/581,038, mail date Nov. 15, 2010, 11 pages.

Palm™ m505 Handheld, printed from internet address: http:/www.palm.com/products/palmm505/ on Sep. 20, 2001 (5 views).

Skyhook Wireless, "How It Works", printed from internet address: http://developer.skyhookwireless.com/how-it-works/, on Apr. 12, 2007, 2 pages.

European search report; EP11195418.6-1244/2434722; Mar. 2, 2012.

Office Action for U.S. Appl. No. 11/823,850, mail date Apr. 27, 2009, 14 pages.

Office Action for U.S. Appl. No. 11/823,850, mail date Nov. 23, 2009, 15 pages.

Office Action U.S. App. No. 11/706,872, mail date Nov. 3, 2009, 9 pages.

"3GPP2 Multimedia Messaging System-MMS Specification Overview—Revision: A" [online], May 2003, Mobile Messaging, [retrieved on Dec. 10, 2004]. Retrieved from the Internet: <URL:http://www.lebodic.net/left.htm>.

Aiken et al., "Microsoft Computer Dictionary," Microsoft Press, 5th ed., p. 523, (pub. May, 1, 2002).

American Programmer, N.Y., American Programmer, Inc. (Dec. 1991), pp. 4-33.

"An Introduction to Mobile Messaging" [online], May 2003, Mobile Messaging, [retrieved on Dec. 10, 2004]. Retrieved from the Internet: <URL:http://www.lebodic.net/intro.htm.

At Last, Technology Harnesse [sic] One of the Most Powerf [sic] Forces known to Man., Foster City, GO Corporation, 1991, 14 pages.

AT&T New Release, NCR Cuts Price of 3170 Notebook Computer 11 to 19 Percent [online]. (Mar. 8, 1993), Retrieved from the Internet: <URL:http://www.att.com/press/0393/930308.nca.html > 2 pages.

Carr, R.M., The Point of the Pen, Byte (Feb. 1991, Reprinted), 10 pages.

"Contact Center Software", Retrieved at<<http://www.genesyslab.com/products/contact_center_software.asp>, Sep. 26, 2008, 1 page.

"CosmoCall Universe", Retrieved at<<http://www.cosmocom.com/productinfo/CollateralMaterials/CosmoCallAgentFeatures.pdf>>, ©2002, 2 pages.

Cullen, A., Connecting With Your EO Cellular Module, Mountain View, EO, Inc., 1992, 1993, pp. ii-33.

Cullen, A., Getting Started With Your EO Personal Communicator, Mountain View, EO, Inc., 1992, 1993, pp. ii-74.

Cullen, A., Lookup Guide to the EO Personal Communicator, Mountain View, EO, Inc., 1992, 1993, pp. ii-320.

Digital Cellular Telecommunications System (Phase 2+); General Description of a GSM Public Land Mobile Network (PLMN) (GSM 01.02 version 6.0.1 Release 1997), ETSI TS 101 622 V6.0.1 (Feb. 2001), 23 pages.

Digital Cellular Telecommunications System (Phase 2+); Specification of the SIM Application Toolkit for the Subscriber Identity Module—Mobile Equipment (SIM-ME) interface (GSM 11.14.Version 5.2.0, Dec. 1996), ETSI, 56 pages.

Go Corporation Information Statement, (Nov. 8, 1993), 228 pages.

Hewlett Packard, Products and services, (http://www.hp.com) Nov. 11, 2001.

IBM Selects Racotek Data/voice Communications Services to Interface With Touchmobile Product, PR Newswire (Jan. 25, 1993), 2 pages.

IBM'S Touchmobile Helps Field Workers Collect Data at the Touch of a Finger, PR Newswire (Jan. 26, 1993), 2 pages.

IBM TouchMobile Information and Planning Guide, International Business Machines Incorporated (Mar. 1993), 20 pages.

IBM TouchMobile Solution for Data Capture and Communication, Keeping Your Business Moving in the 90s, International Business Machines Incorporated (Jan. 1993), 13 pages.

"Siemens HiPath ProCenter Multimedia", Retrieved at<<http://health.siemens.com/portfolio/documents/comm_infrastr/contact_centers/hipath_procenter.pdf>>, ©2006, 5 pages.

Internet Telephony Manager (ITM) User Guide, XP002413107, Dec. 1, 1996, pp. 1-5.

Irfan G., et al., "Blind Channel Identification and Projection Receiver Determination for Multicode and Multirate Situations in DS-COMA Systems", 2001, IEEE. XP002233922; pp. 2197-2200.

MacNeill, D., Messaging Card and NewtonMail: We Pick Up and Deliver, On The Go Magazine [online]. (Oct. 13, 1993), Retrieved from the Internet: <URL:http://www.pencomputing.com/Newton/NewtonNotes2.html > 2 pages.

MacNeill, D., Wireless Newton Technology Goes to Work, On The Go Magazine [online]. (Sep. 8, 1993), Retrieved from the Internet: <URL:http://www.bencomputing.com/Newton/Newton-Notesthtml>, 2 pages.

Maki, K., The AT&T EO Travel Guide, N.Y., John Wiley & Sons, Inc., 1993, pp. iii-555.

Nokia 6630 Users Guide, XP002413106, Mar. 28, 2005, pp. 1-109.

Nokia, Frequently Asked Questions; [online], [retrieved on Nov. 17, 2003], <http://www.nokia.co.in/nokia_apac/india/faqs_list/0,18778,39_41,00.html>.

Nokia Introduces Mobile Chat With Nokia 3310, [online], Sep. 1, 2000, [retrieved on Nov. 17, 2003], <http:... www.mobiletechnews.com/info/2000/09/01/142022.htm>.

PALM, Inc., Redacted Employee Agreement between Palm, Inc. And Amir Haghighat dated Apr. 9, 2007, 9 pages.

"PeopleSoft 8: Web-based Applications Armada", Retrieved at<<http://findarticles.com/p/articles/mi_qa3973/is_200009/ai_n8922878>, Sep. 26, 2008, 5 pages.

(56) References Cited

OTHER PUBLICATIONS

Schlender, B. R., Hot New PCs That Read Your Writing, Fortune (Feb. 11, 1991, Reprinted), 6 pages.
Screen Dumps of Microsoft Internet Explorer 6.0, 2001 pp. 1-13.
Sharma et a., "Intelligent Agents in Call Management System," Integration of Knowledge Intensive Multi-Agent Systems International Conference, XP010793134, Apr. 18, 2005 pp. 9-14.
Stock, R., The World of Messaging An Introduction to Personal Communications, Mountain View, EO, Inc., 1992, 1993, pp. ii-69.
Supplementary European Search Report—EP09773978—Search Authority—The Hague—Jun. 7, 2011.
T-Mobile Products; Handhelds (http://www.tmobile.com) Sep. 28, 2002.
T-Mobile Products; Sidekick (http://www.tmobile.corn) Sep. 28, 2002.
Toshiba Computer Systems Group (htto://www.toshiba,com) May 28, 2002.
Toshiba Computer Systems Group: Pocket PC e570 (http://www.pda.toshiba.com) Jul. 7, 2001.
Vinayaik T., et al., "Multiple Access Interference Resistant Channel Acquisition for Wideband COMA Signals", 2000, IEEE, pp. 956-960.
"Zimbra Email", Retrieved at<<http://www.hmc.edu/about/administrativeoffices/cis1/docs1/centralVemail1/zimbra1/email.html>, Sep. 26, 2008, 6 pages.
US 5,929,648, 07/1999, Albukerk et al. (withdrawn)

\* cited by examiner

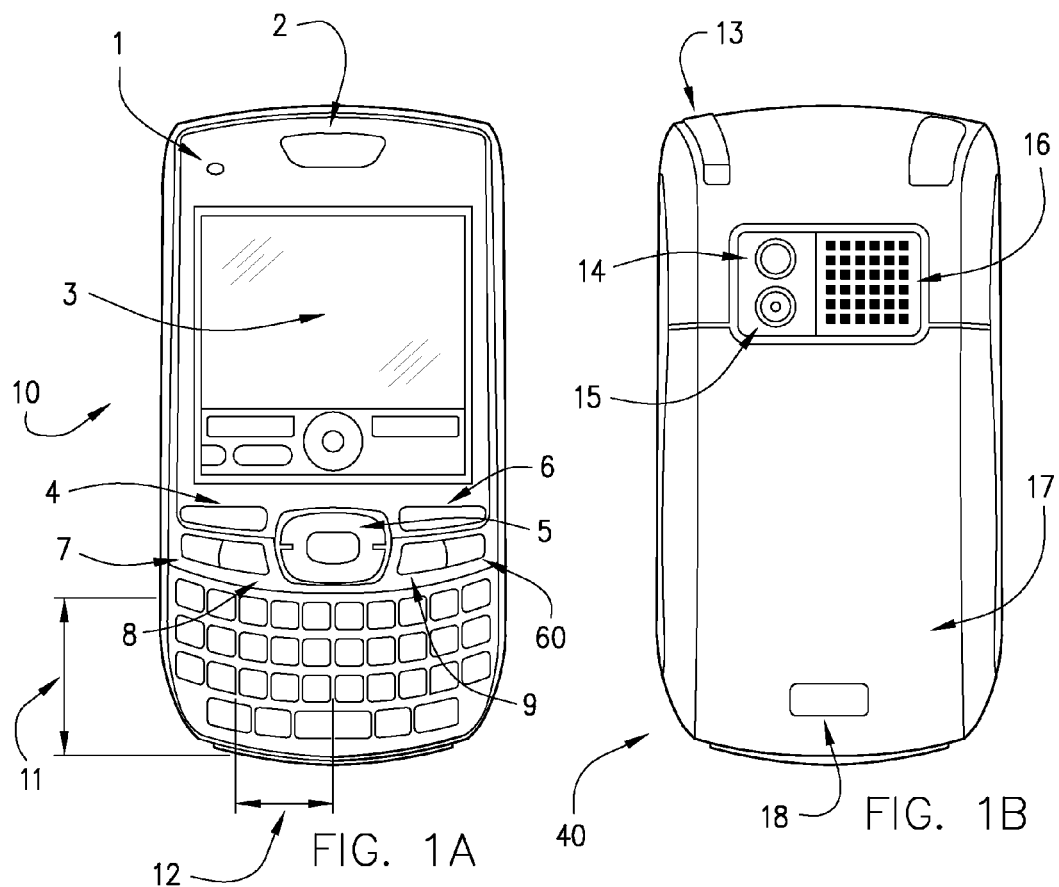
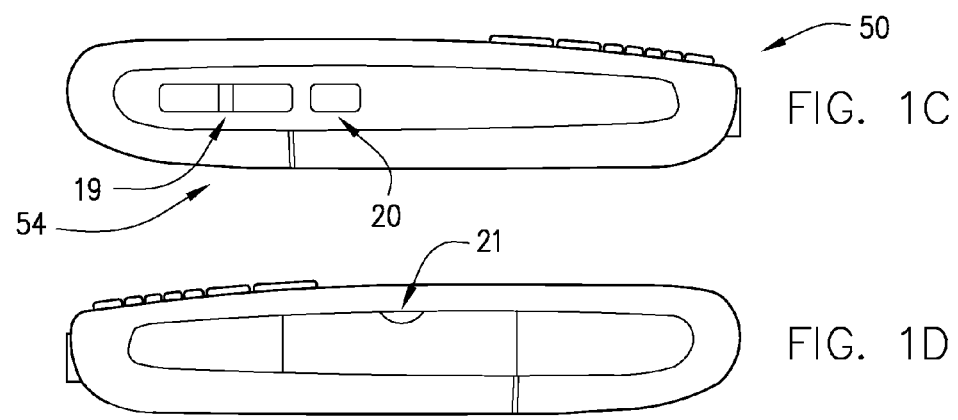
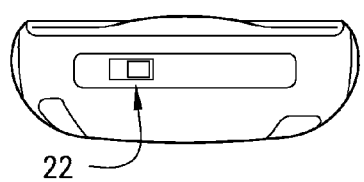
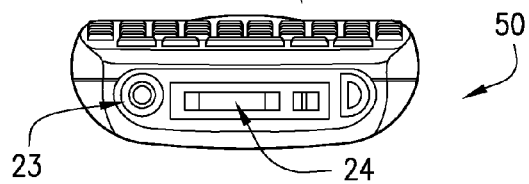

USER DEFINED NAMES FOR DISPLAYING MONITORED LOCATION

BACKGROUND

Tracking applications have been developed to track a user using a device carried by the user. In some of these applications, the device is coupled to a global positioning system (GPS) circuit designed to determine the location of the device. This location information is then uploaded to a server which may be accessible by other users to determine the location of the user being tracked. The location of the user being tracked is displayed using the coordinates of the user to represent the location of the user. In some embodiments the exact location of the user may be blurred by using an inexact measure of the location, however the displayed location of the tracked user is still displayed using the coordinates of the tracked user, albeit using a coarser resolution.

BRIEF DESCRIPTION OF THE DRAWINGS

FIGS. 1A-F illustrate a mobile computing device according to an exemplary embodiment;

DETAILED DESCRIPTION OF EXEMPLARY EMBODIMENTS

Figure 2:
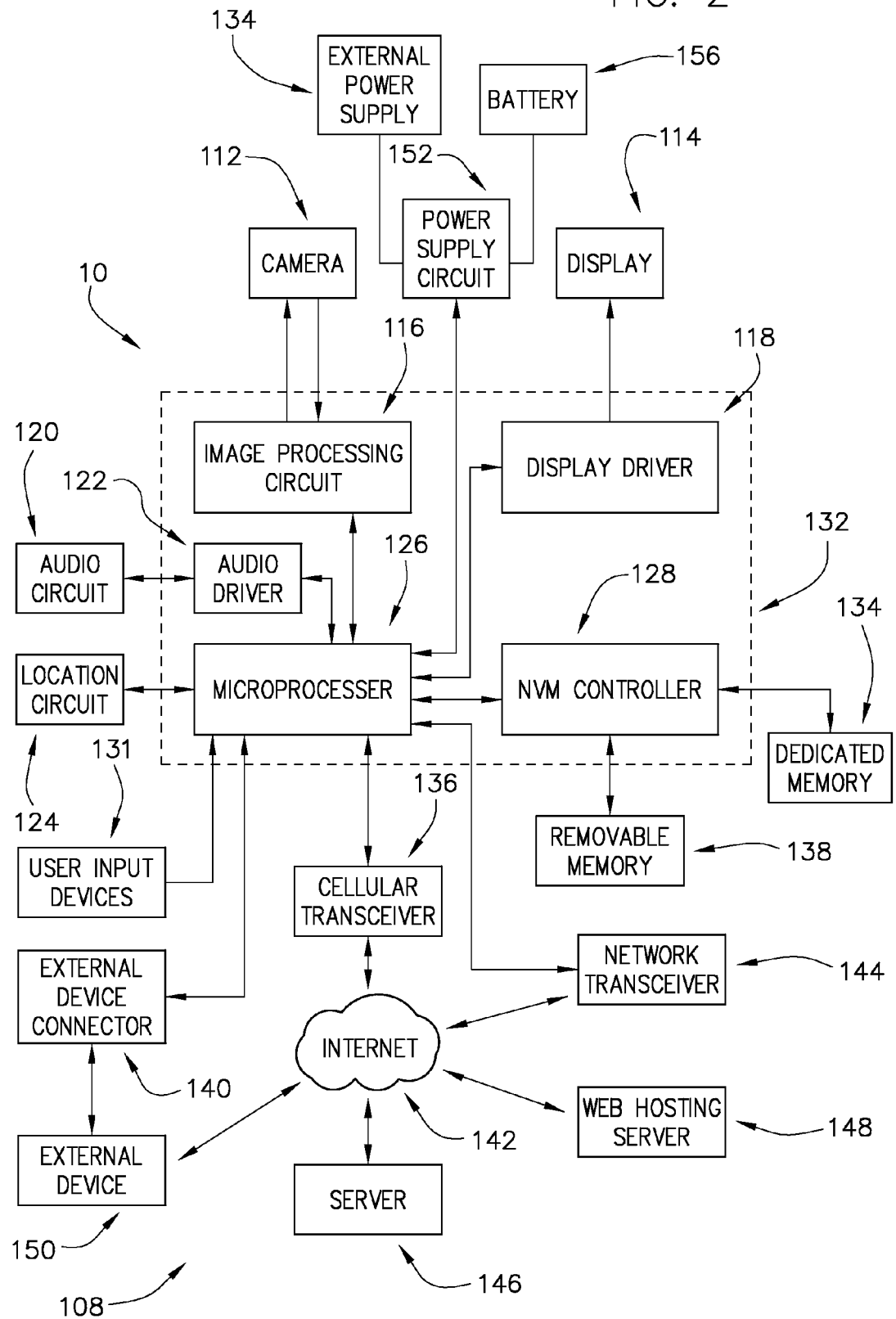
FIG. 2 is a system component block diagram of a system according to one exemplary embodiment.

Referring to FIGS. 1-2, a user's location may be displayed using information other than a coordinate-based representation of the user's location. A user may be tracked by determining the location of a device 10 carried by or otherwise associated with the user. Information on the location of the device 10 may be provided to others using a non-specific and/or user-defined description for the location which may be textual, graphical, and/or take some other form. For example, if the coordinates of the device correspond to those of a restaurant, the location information may be displayed using a name such as "at a restaurant" or "at dinner" to describe the location of the user. The non-specific names may be pre-defined (e.g. a pre-defined name associated with a location, a pre-defined algorithm for assigning names, etc.) or may be user-defined. For example, a user may designate the location of their house to be displayed as "at home." Without more information (i.e. knowing where the person's home is located), a third party viewing the displayed name for the user's current location ("at home") would not know the coordinates (exact or rough) of the user and/or device 10.

The non-specific name (i.e. the name that does not represent coordinates in fine or coarse detail) used to identify the location of the device 10 may be posted to a website (e.g. provided to a web-hosting server 148 through the website or through some other interface). In some embodiments, the device 10 may monitor its location using a location determining circuit 124 (as described below). In other embodiments, a device 146,148,150 external to device 10 may monitor the location of device 10 (e.g. a server may be configured to calculate the position of device 10 based on which cellular towers and/or WiFi access points were accessed by device 10). The location data may be obtained from a GPS circuit, from a beacon configured to transmit data indicative of its location, from another mobile device whose location has been identified (e.g. another portable computing device may have a GPS circuit and may be capable of sharing its location information with other devices in proximity to the other portable computing device), based on data from a motion sensing device (e.g. an accelerometer, a gyro, etc.), and/or some other location providing circuit/device.

No matter how the location of device 10 is determined, device 10 may be configured to receive data indicative of its location (either from the location determining circuit 124 or the external device 146,148,150) and convert that location information to a non-specific and/or user-defined name that is representative of that location. Device 10 may then publish the name representing the location (e.g. to other devices, to a website, etc.). In other embodiments, device 10 and/or external device 146,148,150 may provide coordinate-based and/or other location information to a server 146,148 (or some other device 150) and the server 146,148 (or other device 150) may convert the location information it receives to a non-specific (generic) and/or user-defined name associated with the location it is provided (e.g. the server 146,148 may convert coordinate-based location information and/or location information embodied by a first generic name to a second generic name, which second generic name will be published by the server 146,148).

In some embodiments, the name representing the location information may be posted to a website, such as a social networking website. In these cases, the name may be posted to a generic field on the website (e.g. a field that is not dedicated to displaying location information, a field that allows the user to enter free-form text, etc.). The device 10 may be configured to automatically access the website using the user's access information and post the name associated with the current location of device 10 on the website. In other embodiments, the name associated with the location may be used to fill in fields for applications (e.g. an instant messaging application 202—FIG. 3) running on the device 10.

If the names are user-defined, the user may associate more than one name with a particular location. For example, the user may want to provide one generic name to one set of people (e.g. by posting it to one website) while providing a different generic name to other users (e.g. by posting it to a different website). As another example, a user may want to provide different names for the location on different days, at different times of the day, and/or as a result of other criteria. The system (e.g. device 10, server 146,148, etc.) that associates the identified location with the name assigned to the location may be configured to determine which name to publish based on any number of criteria monitored by the system and/or based on user inputs (e.g. in response to a prompt).

Figure 3:
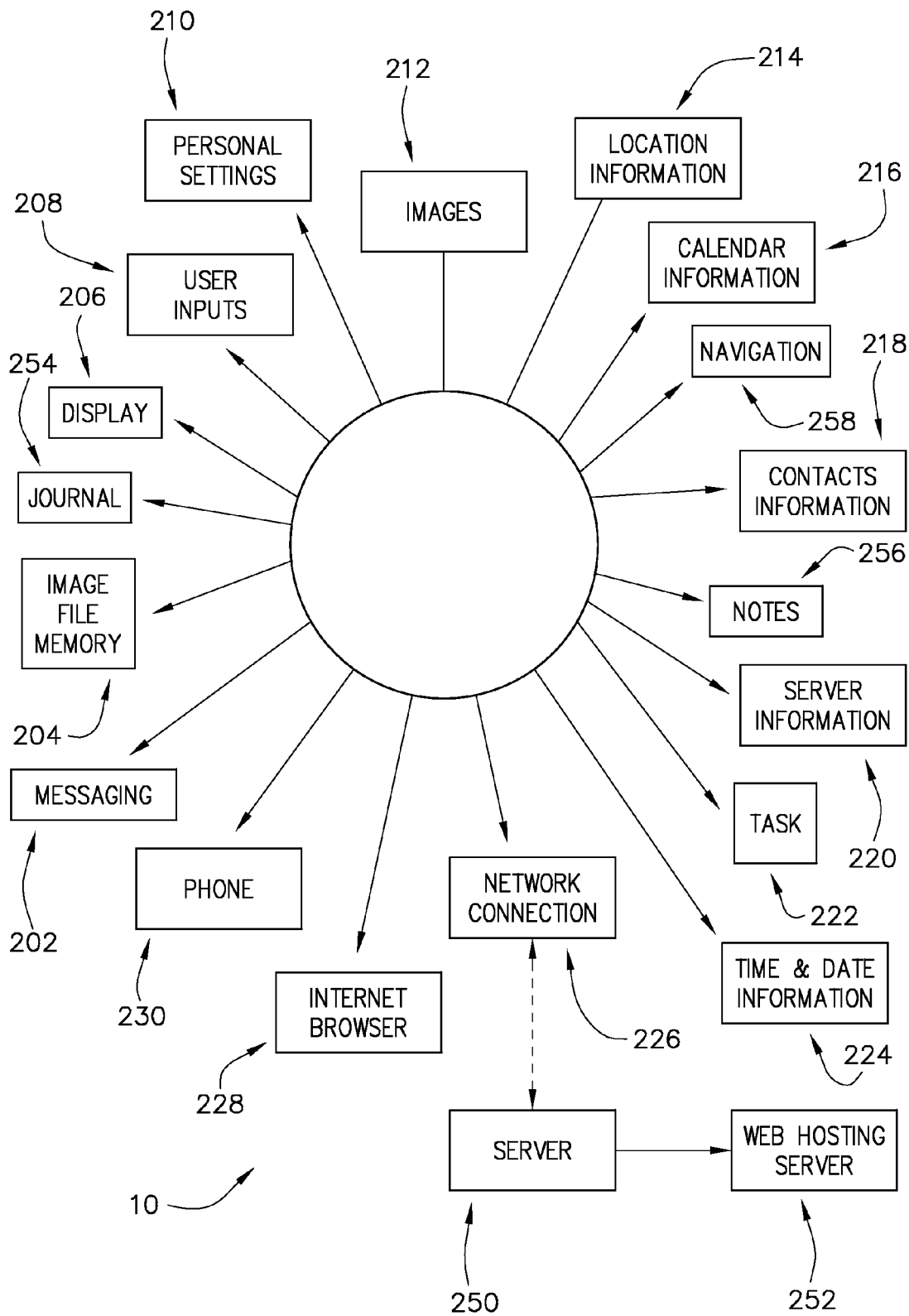
FIG. 3 is an application diagram of a system according to an exemplary embodiment.
Figure 4:
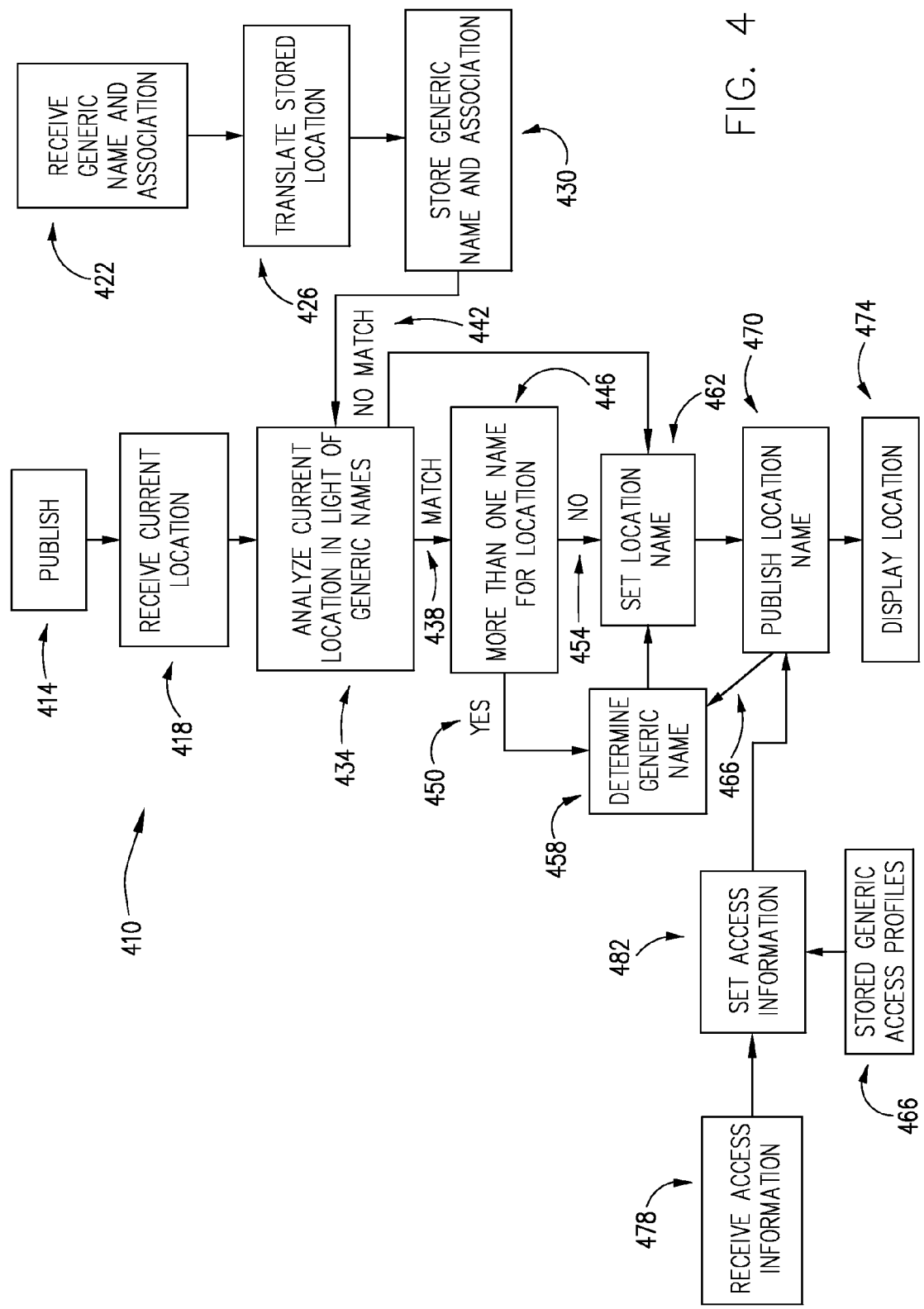
FIG. 4 is a flow diagram of a method according to one embodiment.

Referring to FIGS. 2-4, a method which may be implemented by an application 214 of device 10, server 146,148, and/or some other device 150 is described for providing generalized, non-specific location information. In some embodiments, all or most of the steps of the method are implemented entirely by an application 214 running on one device (e.g. device 10, server 146,148, or device 150). But in some embodiments, more than one of device 10, server 146,148, and device 150 may implement applications 214 which, when used in combination, combine to implement the method.

In some embodiments, the method may involve receiving a user input at block 422 to create a user-defined name that is associated with a particular location. For example, a user may pick names that have meaning to them, but which do not give away the specific location without more information (i.e. generic names). The name may be descriptive (e.g. "at the gym") or may be non-descriptive (e.g. a number unrelated to the location, but which the user can correlate to the location). In some embodiments, the user defined name may be selected from a limited set (e.g. which a user chooses from a list such as a drop-down list) of names (e.g. home, school, work, gym, grocery store, friend's, etc.). In other embodiments, the user defined name may be free form such that a user may enter any name that a user desires to enter (e.g. "pumping iron" for a gym, "bored to tears" for school, "home" for home, etc.). If a user defined name is free-form (i.e. the user can enter any text such as text of any length, any text of a certain length, a predefined text followed by a free-form text, etc.), the user defined name may be non-specific such that it does not signify the actual location without more information, or may be as specific as a user desires (e.g. a user may provide the name "Chicago" when in Chicago and "Milwaukee" when in Milwaukee). In some embodiments, the user-defined name may comprise a graphical image (e.g an icon) representing a location (e.g., a picture of a house for "at home", a picture of a schoolhouse for "at school", etc."), either alone or along with a textual user-defined name and/or a user-defined name in some other visual format. Additionally (or alternatively), in some embodiments the user-defined name may be entered, stored, and/or provided in a format other than (or along with) a visual format (e.g. an audible format).

The user input may be received 422 on a user input device 131 of the mobile computing device 10, a user input device of some other device 150 (e.g. a user input device of a computer that synchronizes with the mobile computing device, a user input device that interfaces with a server which sends—pushes, makes accessible, etc. —information to the mobile computing device 10, etc.), some other user input device, and/or any combination of user input devices.

In some embodiments, the user input received at block 422 may be directed to the purpose of creating user-defined names for publishing the location of the mobile computing device 10 (e.g. may be entered as part of an application 214 that is configured to correlate and/or publish user-defined names to represent the location of the device 10). For example, the user may provide an input which is received at block 422 to indicate that the current location of the device 10 should be assigned a particular name. As another example, a user may be able to assign names to locations other than the current location of the device 10. For instance, the user may input addresses and assign names to those addresses, may assign names to coordinates (e.g. latitude and longitude) (e.g. coordinates relevant to a geo-caching website), the user may select a location on a map (e.g. using a graphical user interface) and assign a name to that location, and/or may provide an input in some other manner to assign names to the locations.

In some embodiments, the user input received at block 422 may be part of another application which receives both user defined names and locations, but which has a primary purpose other than creating user defined names for locations for publishing the users location. For example, the device 10 or server 146,148 may include a contacts application 218. The user provides contact information for a contact in the contacts application 218, which contact information may include location information for the contact. An application 214 may analyze the contact information received 422 in the contact application 218 to create user defined names. The user defined name may be based on information contained in each contact (e.g. at "Joe Smith" or at "Joe's House") or may be based on data associated with the contact (e.g. if the contact is grouped with other contacts, the user defined name may be set to the name chosen for the group, such as "with family" or "at friend's house" or "at client's location" or "at supplier's facility").

In some embodiments, generic and/or user-defined names (e.g. generic user-defined names) may be received 422 from a file provided to (e.g. downloaded by) device 10 and/or server 146,148 (e.g. actively downloaded by the user, sent to the user by another user from their device, etc.). The file may contain general generic names or may contain user-defined names created on a different device (e.g. device 150, server 146, etc.) and transferred to device 10 and/or 146,148 (e.g. from server 146 to device 10).

The name defined may also be based on various criteria other than (and/or in addition to) location (i.e. non-location criteria), such as speed and/or devices connected to device 10. For example, if it is determined that a user is traveling above a normal speed of movement, a generic name may be set as "traveling." As another example, if a user is connected to a docking station at the user's home or a desktop computer at the user's home, the location may be set to "at home." As still another example, if device 10 is connected to a car system (e.g. a Bluetooth phone system in a user's car), the name may be set as "in car" or "traveling." As still another example, various characteristics of a user (e.g. speed, heart rate, etc.) being monitored by device 10 (either directly or receiving data indirectly) may be used to identify that a user is exercising, which may be used to set the name provided.

In some embodiments, a generic name may be chosen which is based on point of interest information stored in a database. For example, a navigation application 258 may include a database of information on points of interest. As another example, the Internet may include various information relating to points of interest. The information relating to the points of interest may be received 422 and a generic name may be created based on this information. For instance, if the point of interest is a restaurant, a generic name such as "eating" or "out to dinner" may be created.

The location may be defined in any manner. For example, the location may be defined as a point (e.g. an address, coordinates, etc.), as an area (e.g. an area defined by a route such as a train route taken to work) which area may be allowed to have a regular (e.g. circular, rectangular, etc.) or irregular shape (e.g. a user drawn shape).

The name may be received 422 and associated with a location that is provided in a location format other than that used by the analysis step 434. If so, the format of the location information with which the name is associated may be translated 426 to a location format that is operated on by the application 214 in the analysis step 434. For example, in some embodiments, the location may be entered as an address, as a selection of a point on a map, as a button press indicating that the current location should be chosen, etc. In some embodiments, the analysis step 434 may involve analyzing location based on a grid (e.g. based on latitude and longitude and/or other coordinates). In these embodiments, the location associated with the user defined name may be converted from the format in which it was entered (e.g. map, address, etc.) to the format used by the application 214 performing the comparison (e.g. coordinates).

The received 422 location name and its association with a location (e.g. a converted 426 location) may be stored 430 in a memory (e.g. as a file, as part of a software program, etc.), such as memory 134,138 of device 10, a memory of a server 146,148, a memory of device 150, and/or some other memory. Data indicative of the association (i.e. data showing, providing a basis to show, and/or suggesting the association) may be stored in any form (e.g. as a data file, along with the name data, separate from the name data, in an index, in a table, and/or in some other form). The data for the location associated with the name can also be saved in any form (e.g. in a data file that includes coordinates, in a data file that includes a range, in a data file that defines a boundary, in software, hard-coded, in a combination of software and a data file such as a data file that represents a location point along with software that automatically creates a boundary around the point, and/or may be saved in some other form). In some of these and other embodiments, some or all of the names may be hard-coded by circuit components.

In operation, an application 214 determines at block 414 whether location information (e.g. tracking information) is to be provided. Location information may be provided continuously, may be provided periodically, may be provided in response to a prompt (such as a user input or a request from another device 146,148,150 for location information), may be provided in response to monitored conditions (e.g. time of day, location, etc.), may be provide in response to an event (e.g. receipt of a text or other message), etc. Additionally (or alternatively), determining whether location information is to be provided at block 414 may be controlled by any number of other criteria such as conditions monitored by or relating to the mobile computing device 10. For example, various criteria related to the mobile computing device (e.g. speed and direction) may be monitored to determine whether the mobile computing device is at a location or is merely passing near a location.

If the device 10 is tracked periodically, in some embodiments the period may be at least (i.e. the period may be this or more than this amount) about 1, 3, 5, 10, 20, 40, 60, 90, and/or 120 minutes. In some embodiments, the period may be user definable, and/or may be user definable to be set at least one (and/or at least a plurality of) period(s) which is/are at least about 3, 5, 10, 20, 40, 60, 90, and/or 120 minutes and/or up to about 240, 180, 120, 90, 60, 30, and/or 15 minutes.

If location information is to be provided at block 414 then a current location of the mobile computing device 10 is received at block 418. The current location may be received from a location-determining circuit 124 of device 10. Various types of location determining circuits 124 suitable for obtaining a current location are discussed below. Alternatively (or additionally), in some embodiments the current location of device 10 may be determined by a device 146,148,150 separate from device 10 (e.g. a server 146 that determines location based on the cell towers, WiFi access points, and/or other wireless access point to which the mobile computing device 10 is connected). The current location may be retained and used by the device 10,146,148,150 which determined the current location, or may be sent to another device (e.g. may be obtained by device 10 and sent to server 146,148, may be obtained by server 146,148 and sent to device 10, may be obtained by a first server 146 and sent to a second server 148, etc.). In some embodiments, the current location may be accurate within at least 10 km, 5 km, 1 km, 740 m, 500 m, 250 m, 100 m, 50 m, 25 m, 10 m, 5 m, and/or 1 m. However in some embodiments (including some of these embodiments), the current location received at block 418 and operated on later in the method (e.g. at block 434) may not need to be highly accurate; the location data received may not need to be provided at a high degree of specificity. In some embodiments, at least some of the location data received 418 by and operated 434 on may not have an accuracy of (with high confidence) closer than 1 m, 5 m, 10 m, 25 m, 50 m, 100 m, 200 m, 400 m, 600 m, 800 m, 1 km, and/or 2 km (e.g. if the system operates on a rough calculation obtained from the location determining circuit 124 before the location determining circuit 124 was capable of providing a highly accurate reading). In some embodiments, the specificity required may be user selectable.

Once the current location of the mobile computing device 10 is received at block 418, the current location may be analyzed 434 with respect to (e.g. compared to) the locations associated with the names stored 430 in the memory. The analysis 434 may include a comparison of the current location to an area defined by the stored 430 association, may involve determining the distance from the current location to the location stored 430, may involve determining a speed and/or direction of movement of the mobile computing device 10 (e.g. to determine whether the mobile computing device 10 is stopping at the location or merely passing by), and/or may involve analysis of any number of other criteria. Any of these criteria may be used to determine whether the current location of the mobile computing device is associated with a name stored in memory (e.g. generic, user-defined name). For any of these criteria that are evaluated (e.g. distance between a location stored 430 in memory and the current location), the value used when evaluating the criteria (e.g. how close the current location 418 needs to be to the stored 430 location) may be user-definable and/or may be defined based on the values of other monitored criteria.

If there is no match at block 442, the application 214 may return to block 414 to start the back at the step of determining whether the current location of the device 10 should be published. Alternatively, if there is no match, the application 214 may proceed along path 442 to block 462 to set a location name. For example, the current location may be set 462 to be represented by a default name (e.g. "out," "around," "unknown," "none of your business," " ", etc.) when the current location does not match a location stored 430 in the memory. As another example, the current location may be set 462 to be represented by a blank entry (e.g. a blank name may be published, a command to clear the last name published may be sent, etc.) when the current location does not match a location stored 430 in the memory (e.g. to remove a location name previously published 470 which is no longer the current location of the device 10).

If there is a match from the comparison at block 434, the system proceeds 438 to block 446 to determine whether more than one name is associated with the current location. This may occur if two locations are located in proximity to each other or have overlapping areas. This may also occur if a user has defined more than one name for a particular location. For example, a user might set the application 214 to post the location of device 10 to multiple sites (e.g. multiple websites, a website and an application on device 10, etc.) that are intended for different audiences and might choose to post different names to describe the location to the different sites. As another example, a user may wish to describe the same place by different names depending on the user's mood or some other criteria (e.g. time of day).

If more than one name is associated with a location at block 446, the method 410 proceeds at path 450 to block 458 to determine which name to publish. Determining which name to publish at block 458 may involve determining which of the multiple locations in proximity to the current location is closest to the current location, may involve prompting the user to select a name, may involve determining the site to which the name will be published, may involve a hierarchy such that certain names receive priority over others, may involve analyzing user preferences (e.g. stored in a file), etc. The name determined at block 458 may be determined based on monitored criteria other than location. For example, the name determined at block 458 may be based on time and date information such as day of the week, time of day, etc. (e.g. if the device 10 is in proximity to a restaurant and the time of day is in the evening, the name chosen may be "at dinner" whereas if the time of day were around noon the name chosen may be "at lunch").

Once the name to provide has been determined at block 458 or if only one name is associated with the location at block 462 (so proceeds along path 454), the name to be used to represent the current location is set at block 462. A name that is set at block 462 may then be provided at block 470. In some embodiments, providing location information at block 470 may include providing the location information to an application which uses the information wholly within the device 10 being tracked (e.g. a journaling application 254 that does not regularly publish information). In some embodiments, providing information at block 470 may include publishing the name (e.g. provide the name directly to or in a manner reviewable by devices 150 other than the device 10 being tracked). Examples of devices to which the name representing the location may be published include providing the location name to other mobile computing devices, providing the location name to a display separate from and not controlled directly by the device 10, providing the location information to a server 146,148 which server 146,148 may publish the information to other devices 150 (e.g. by providing the location information on an Internet website and/or other network accessible site). If sent directly to other mobile devices, the other mobile devices (and/or device 10) may be configured to implement an application designed to track one or more other devices based on generic or user-defined names (and/or based on coordinate-based location data).

Publishing 470 may involve sending the name directly to another device, may involve posting the location on a website, may involve providing the name in another application which makes the name viewable by other devices (e.g. in a field of an instant messaging (IM) application 202—such as a field available for describing the user of the IM application— viewable by at least some of those with whom the IM session is established), and/or may involve some other type of publishing. One device 10 may publish to another device 150 by sending a message (e.g. a mobile device and/or a phone messaging message such as a text message—e.g. an SMS message—an MMS message, etc.), by using an interface such as an application programming interface (API) like a representational state transfer (REST) API, and/or by some other method.

If the name representative of the current location is published on a website or used in an application (or published in some other manner), the name may be posted in a field dedicated to tracking users or may be posted in a field that is not designed for and/or dedicated to tracking users. For example, the name may be posted on a website or in a GUI of an application in a field that is open to receipt of text, which field may be used for purposes other than tracking a user. For websites with text fields, a user may allow the application 214 to post the location name associated with the current location of device 10 in the text field automatically (e.g. continuously; based on criteria other than those discussed above such as time of day, a user flag set to turn the feature on, a response from a user to a prompt regarding whether to publish the location, etc.).

If more than one name is to be published (e.g. if different location names are provided to different receiving devices 146,148,150), the method may return to block 458 along line 466 to determine 458 and set 462 a new location name which is then published 470.

The recipient (e.g. recipient device 146,148,150 such as a recipient mobile device 150 or recipient server 148 of a website; recipient person; etc.) receiving the published name for the location of device 10 may then display 474 the name it receives. The name may be displayed 474 in a field dedicated to displaying location information, may be displayed 474 in a field directed to providing general information about a user of the device 10, may be displayed 474 in a text addressable field, and/or may be displayed 474 in some other manner.

If the information to be published will be published to a website or some other server-based system at block 470, the method may involve receiving access information from a user at block 478 such that the device(s) 10,146,148,150 having the application(s) implementing the method may automatically access the server 146,148 receiving the information. The access information provided at block 478 may include information such as a user login, a user password, a link to the website, website interface access information, an identification of a field on the website where the location name should be entered, an indication of where to upload information to the server 146,148, etc. The access information provided at block 478 may be provided in its entirety at block 478, or the information provided at block 478 may be supplemented at block 486 by stored generic profiles that store access information for one, a plurality, and/or a multiplicity of servers (e.g. websites). The generic access profiles provided at block 486 may be stored in a memory of the device 10,146,148,150 implementing the method (e.g. memory 134,138 of device 10), may be downloaded from the server 146,148 or device 150 to which the name will be published 470, may be downloaded from a server 146,148 other than the one to which the name will be published 470, and/or may be provided from some other source. The generic access profiles provided at block 486 may be used to supplement the information provided at block 478, may be used to direct the type of information received at block 478, may be used to control the type of information requested from a user to be received at block 478, etc.

Journaling Application

Referring to FIG. 3, a device 10 and/or other system may be configured to implement a journaling application 254. Journaling application 254 may be configured to receive the user-defined/generic names and automatically enter information in a journal based on these names. In other embodiments, journaling application 254 may not enter the information in a journal, but may consolidate and/or otherwise make this information available to a user so that the user can consult this location information history when making journal entries. Journaling application 254 may also gather information from any number of other applications such as an imaging application 212 (e.g. collecting images associated with what the user did), a calendar application 216 (e.g. showing meetings a user had scheduled), a notes application 256 (e.g. to show what files a user worked with), a task application (e.g. to show what tasks were entered and/or completed), a phone application 230 (e.g. to show who a user talked with and/or for how long), a messaging application 202 (e.g. to show who a user messaged that day), and/or some other application. Like the location information, journaling application 254 may be configured to enter the information from these other applications in a journal, may be configured to enter information from only a subset of these applications in a journal, may not be configured to enter the information from one or more of these applications in a journal but be configured to make this information available to a user so that the user can consult this information when making journal entries, etc.

Location-based Reminders

Referring to FIGS. 2 and 3, a device 10 may be configured to implement a task application 222 and/or a note application 256 based on location information obtained from a location application 214. For example, the application 222,256 may be configured to allow a user to associate an entry (note, task, etc.) with a location. When location application 214 provides a current location that approaches that location, the application 222,256 may be configured to prompt a user which may be visual, audible, tactile, and/or may take some other form (e.g. with an alarm, by displaying the note or task, by vibrating, etc.). In one advantageous embodiment, the application 222,256 may be configured to prompt a user based on a determination that device 10 is leaving the location. For example, a user may have a set of notes and/or tasks set to be displayed to the user as the user leaves their work, their house, school, etc. In this way, a user may set reminders to be played when most likely to be acted on by the user. Whether device 10 is leaving a location may be judged by one or more of any number of criteria in addition to location, such as the direction device 10 is traveling, whether device 10 crossed one or more boundaries around the location (e.g. a pre-drawn boundary, a radius from a specific location, etc.), and/or other criteria.

The location for a reminder (either approaching or leaving) may be set as a specific location (e.g. a specific address) or may be set to a general location (e.g. a grocery list may be set to provide a reminder at a "grocery store" or "Company X grocery store" such that when the device 10 approaches any grocery store meeting the criteria, the device will provide a reminder to the user). The device 10 may have a list of types of locations, may store a list of locations that a user frequents and then use the locations from that list to determine whether the location criteria is satisfied, may access information from a server (e.g. website), may access information over the Internet, may access information stored on a device with which the device 10 communicates, and/or may obtain the information from any other source.

Additionally, the location may be a moving location. For example, a user may set the location as a reminder to buy ice cream if they become in proximity to an ice cream truck. As another example, the user may set a reminder that provides notes about something the user is supposed to discuss with another person whose location is being monitored (e.g. through a device carried by that person). Here, the first party's device may have a reminder that includes information relating to the second party (e.g. ask employee if he's filled out a particular report), the second party may carry a mobile device (or other location providing device) that broadcasts its location to the first party's mobile device 10 (either directly or indirectly such as by way of a server), and the first party's device 10 may determine that the second party is nearing the first party and so the device 10 provides a notification which may include the information from the reminder.

The location for the reminder may be set based on data provided from a contacts application 218, a calendar application 216, and/or some other application. The location for a task or note may be defined by non-specific and/or user-defined names associated by the user with a particular location.

The notes or tasks associated with the location may be set on the device running the application 222,256, by the user of the device on a device other than the device implementing the application 222,256, and/or by a third party.

In some embodiments, the task 222 and/or note 256 application runs on the device 10 being tracked. In other embodiments, the applications 222,256 may run on a server which receives information relating to the location of the device 10 being tracked. In these embodiments, the server may be configured to send data to the device 10 when the criteria for the note and/or task is met.

Figure 5:
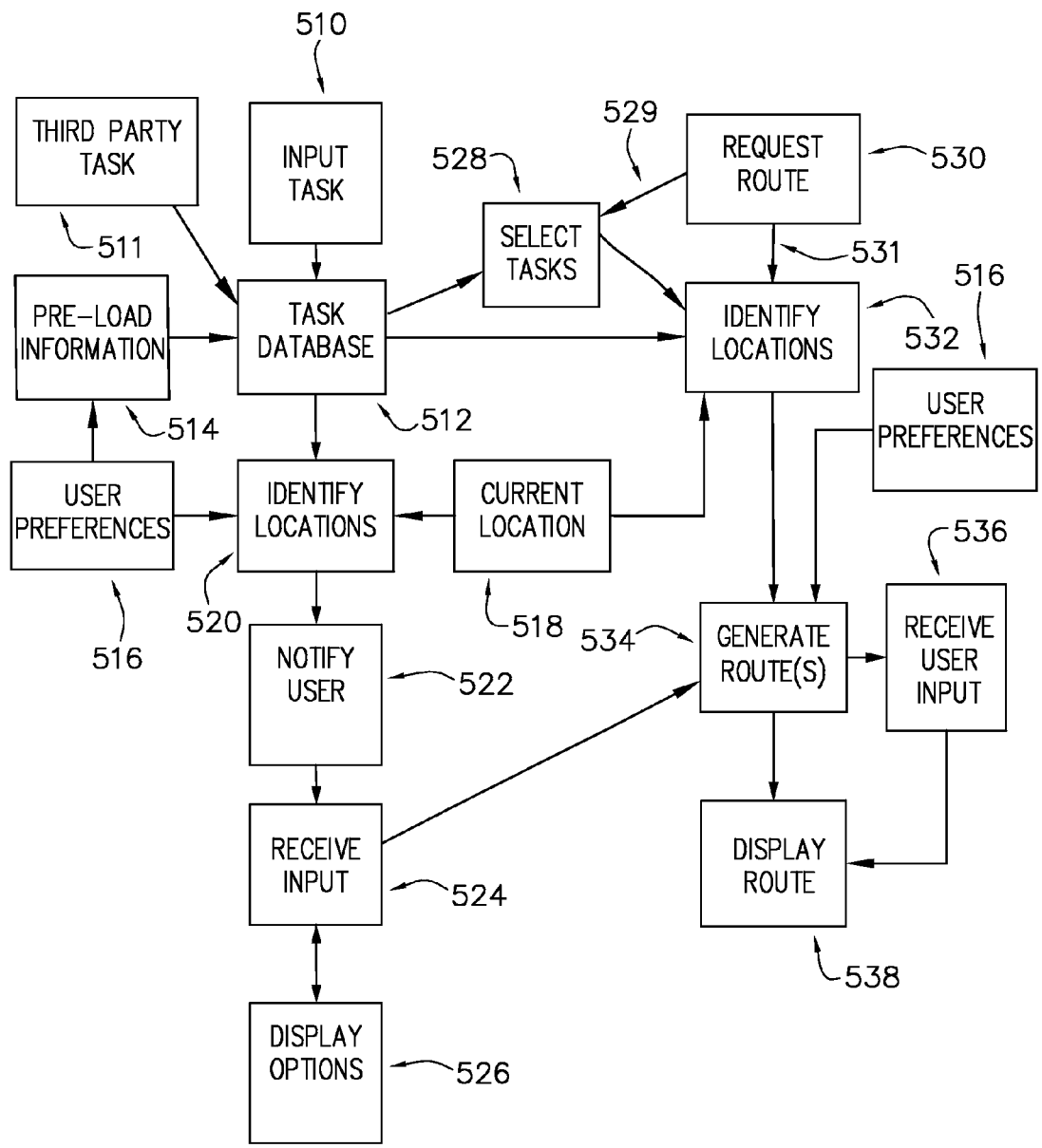
FIG. 5 is a flow diagram of a method according to one embodiment.

Referring to FIG. 5, a user inputs and a system receives a task at block 510. The information inputted by the user may include a description of the task, information related to completion of the task (e.g. a location where the task can be completed, a name of a store where to complete the task, a class (e.g. grocery store) of places where the task can be completed, etc.). The system for inputting tasks may be arranged such that a user can group tasks with a common location (e.g. using a task tree or other mechanism for grouping tasks).

In some embodiments, tasks may be automatically input by a system and received by the system implementing the method of FIG. 5. For example, a user's device may have a data link with another system (e.g. a car), and the other system may be configured to input tasks in the device based on monitored criteria of the other system (e.g. input a need gas task when the car is running low on gas).

In some embodiments, a user may input a location for completing the task when the task is entered. Alternatively (or additionally), the system may be configured to receive task information and identify locations for completing the task based on the nature of the task. For example, the system may interpret a task list entry "pick up milk" as being completed at a grocery store and/or a convenience store.

In some embodiments, a task list may be shared between multiple people. For example, a task can be input by another system based on a task input by a user on a different task list. The input task information may be provided at block 511 and entered in to the task database at block 512.

In some embodiments, a task may be sent to a first user (e.g. by a device or system of the first user) to a second user (e.g. to a device or system of the second user). The first user may send the task information by inputting it into a server, by sending a message (e.g. an e-mail message, a text message, an SMS message, etc.), by synching a program, and/or by some other means. The task may be received at block 511 (e.g. obtained, opened, saved, accepted, etc.) and entered into the task database at block 512 for the second user. The tasks at block 511 may contain any of the information discussed above for a task entered at block 510.

The task information may be used to populate a task database at block 512, which may include one or more of task information, location information associated with the task information, user preference information associated with the task information, and/or other information.

In some embodiments, the method involves pre-loading location information at block 514 based on the information in the task database at block 512 (e.g. based on and/or in response to the tasks entered at block 510). Pre-loading information may include downloading location information (e.g. coordinate information) where a user can complete the task. The pre-loaded information may be limited based on user preferences stored at block 516, may be limited based on user tendencies (e.g. the system may look for locations along the path commonly taken by the user which may be manually entered by the user, may be passively observed by the system, may be saved in a file, etc.), may be limited based on availability (e.g. based on what stores might be open at a particular time for a task to be completed) and/or may be limited based on other information.

User preferences at block 516 may be based on a user input indicative of the preferences, based on responses to questions indicative of preferences, based on monitoring other applications and/or other information associated with the user, and/ or based on other sources of information relating to preferences. For example, a user's device may be monitored for logging on to a particular bank's website. By accessing that website, a system might presume that it is likely that a user has an account at that bank. If a task is "pick up cash," "cash check," and/or some other banking task, then the system may be designed to guide a user to a banking location (bank, ATM, etc.) associated with that bank.

In some embodiments, the information may be pre-loaded to a device when a task is entered, and/or may be pre-loaded during selected periods. The selected periods may include while a mobile device has externally supplied power, may include while a mobile device is not being used for other purposes, may include specific times of day, may include in response to a user input to pre-load information, etc. The pre-loaded information may be obtained from a database local to the system, may be obtained from a database maintained on a server, may be received by scanning multiple different databases, may be obtained from a database over a network such as the Internet, and/or may be obtained from some other source.

A system may be configured to receive a current location of a device associated with the user at block 518. The location information may be obtained in any of the manners discussed above or below (e.g. by monitoring a GPS unit of a mobile device associated with the user, by noting the locations of wireless access points accessed by a device, by receiving location information sent by a device associated with the location of the user that communicates with the system running the task location program, etc.).

The system is configured to identify locations in proximity to the user capable of completing the task at block 520. Identifying locations in proximity to the user for completing the task may include comparing current location of the user with the pre-loaded location data stored in the task database at block 512. Alternatively (or additionally), the current location of the user may be used to query, at block 520, a database or other information source for locations capable of completing the task. The locations retrieved at block 520 may be limited in any one or more of the manners discussed above for block 514. The locations retrieved at block 520 (whether retrieved initially or based on pre-loaded data) may also be limited based on the current location, direction, speed, and/or other criteria related to the device. In some embodiment, the system may be configured to identify locations farther ahead of the user in the direction that the user is traveling when the user is traveling at high speeds in order to give the user time to choose the location. In some embodiments, the system may be configured to not retrieve and/or notify (see block 522) a user of a location for completing a task if the user is traveling above a threshold (fixed or variable) speed and/or based on other criteria (such as road work in the vicinity of the user, traffic conditions in proximity to the user, user preferences, the complexity of the route of the user, etc).

Once locations are identified, a user may be notified at block 522 of their proximity to a location where a task can be completed. The notification may be audible (a tone such as a user settable tone, a text to speech module that speaks the name of a location, etc.), tactile (e.g. vibration), and/or visual (e.g. a flashing light such as a flashing LED, an image on a graphical user display such as an icon, a map showing a location where the task can be completed, user controllable options such as to route to the location, and/or some other visual notification). The notification at block 522 may also be implemented as a message (e.g. an e-mail, SMS, or text message) and/or may be implemented on a separate device (e.g. played through a speaker mounted in a vehicle).

Once a user is notified, the system may wait for an input (e.g. a user input to clear the alarm, a user entering an identified location to clear the alarm, a user input to route to the location, a user input to display alternative locations, etc.). If an input is received to display multiple locations in proximity to the user for completing the task, the system may be configured to display multiple options at block 526 and allow a user to input a selection of a particular location at block 524. A user may also input a request to route to the displayed and/or selected location, so the system may be configured to generate one or more routes to the selected location at block 534 discussed below.

In addition to monitoring for proximity to locations for completing tasks, the system may also be configured to provide a route to a location for completing a task in response to receiving a request for a route (from a user, from another application on the system, from another system, etc.) at block 530. The route may be designed to head to locations to complete all tasks (along line 531), and/or a user may be allowed along line 529 to select a subset (e.g a single or group of tasks) of tasks at block 528.

Once the tasks to be completed are identified, one or more locations associated with each task may be obtained at block 532, which block may operate in any of the manners discussed above for block 520, including identifying locations based on pre-loaded location information.

The locations identified at block 532 are used to generate one or more routes at block 534. In some embodiments, generating a route at block 534 may include accessing stored route and/or preference information from a user to identify common routes and/or route preferences. In some embodiments, generating a route at block 534 may include displaying multiple location options to a user (singularly and/or grouped) and allowing a user to select individual locations. In some of these embodiments, information in addition to the location (e.g. the amount of time each location would add to the route) may be displayed along with the different locations. In some embodiments, generating a route at block 534 may include prompting a user for an input (e.g. if they want to use the highway, get the most use of the highway, get the least use of the highway, avoid tolls, take a scenic route, avoid construction, avoid traffic, etc.). In some embodiments, the system may be configured to generate a route at block 534 based on traffic information (e.g. currently monitored traffic information, historical traffic information for a location at a given time) and/or any other information (e.g. time of day, common routes of a user, traffic light patterns, etc.). In some embodiments, generating a route at block 534 may include generating the route based on the operating hours (e.g. based on a database such as a website associated with the location and/or an information gathering source) of the locations identified and/or selected for completing the task (e.g. to give a user the best opportunity to go to each of the locations during the location's operating hours).

If more than one route is generated at block 534, a user may be allowed to select a desired route at block 536. The generated 534 and/or selected 536 route is then displayed at block 538. Displaying a route at block 538 may be include displaying the route on the system creating the route and/or transferring the route to another system (e.g. wirelessly over a point-to-point, local area, and/or wide area network) which system may display the route.

In many embodiments, the tasks received at block 510 may include deadlines in addition to other information. In some embodiments, the deadline associated with the task may be used to control the displayed location(s) for completing the task. For example, proximity to the current location needed to identify a location associated with a task at block 520 or 532 may become less proximate as the time (e.g. date) gets closer to the deadline. In many embodiments, the system may be configured to notify a user at block 522 based on an approaching deadline as well as being in proximity to a location to complete a task.

In some embodiments where a specific location or class of locations (e.g. grocery store, hardware store, swimming pool, etc.), one or more of pre-loading at 514, identifying at 520, and identifying at 532 may be implemented based on the location (e.g. class of locations) entered with task, on similar locations (e.g. if a particular grocery store is entered, the system may load and/or identify other locations for completing the task), and/or related locations (e.g. other stores belonging to the same chain of stores as a store identified).

Any of the steps described in FIG. 5 may be implemented in a mobile device 10 (FIG. 1) associated with a user (e.g. by a processing circuit such as a microprocessor configured to implement the method), in a server system (e.g. in one or more processing circuits of one or more servers 146 (FIG. 2) which may or may not be located in a common location that is/are configured to implement the method), and/or on some other device 150 (FIG. 2). In some embodiments, the method is implemented primarily in a mobile device 10 (e.g. all or any of the steps are implemented by the mobile device 10, although some steps may be implemented in another device) associated with the user. In some embodiments, the method is implemented primarily in a server system 146. In some embodiments, the method is implemented primarily in a combination of a mobile device 10 associated with the user and a server system 146. In many embodiments, the current location of the user is obtained at block 518 by a location determining circuit 124 associated with (e.g. built in) the mobile device 10. In some embodiments, the current location at block 518 is obtained based on a wireless network (e.g. cell or WiFi network) accessed by the mobile device.

Other Features

Referring back to FIG. 2, portable device 10 may be a mobile computing device capable of executing software programs. The device 10 may be implemented as a combination handheld computer and mobile telephone, sometimes referred to as a smart phone. Examples of smart phones include, for example, Palm® products such as Palm® Treo™ smart phones. Although some embodiments may be described with portable device 10 implemented as a smart phone by way of example, it may be appreciated that the embodiments are not limited in this context. For example, portable device 10 may comprise, or be implemented as, any type of wireless device, mobile station, or portable computing device with a self-contained power source (e.g., battery) such as a laptop computer, ultra-laptop computer, personal digital assistant (PDA), cellular telephone, combination cellular telephone/PDA, mobile unit, subscriber station, user terminal, portable computer, handheld computer, palmtop computer, wearable computer, media player, camera, pager, messaging device, data communication device, and so forth.

Processing circuit 132 of hand-held device 10 may include one or more of a microprocessor 126, second microprocessor 126, image processing circuit 116, display driver 118, a memory (e.g. non-volatile memory—NVM) controller 128, audio driver 122 (e.g. D/A converter, A/D converter, an audio coder and/or decoder (codec), amplifier, etc.), and other processing circuits. Processing circuit 132 can include various types of processing circuitry, digital and/or analog, and may include one or more of a microprocessor, microcontroller, application-specific integrated circuit (ASIC), field programmable gate array (FPGA), or other circuitry configured to perform various input/output, control, analysis, and other functions. In various embodiments, the processing circuit 132 may include a central processing unit (CPU) using any suitable processor or logic device, such as a as a general purpose processor. Processing circuit 132 may include, or be implemented as, a chip multiprocessor (CMP), dedicated processor, embedded processor, media processor, input/output (I/O) processor, co-processor, a microprocessor such as a complex instruction set computer (CISC) microprocessor, a reduced instruction set computing (RISC) microprocessor, and/or a very long instruction word (VLIW) microprocessor, a processor implementing a combination of instruction sets, a controller, a microcontroller, an application specific integrated circuit (ASIC), a field programmable gate array (FPGA), a programmable logic device (PLD), or other processing device in accordance with the described embodiments.

Processing circuit 132 may be configured to digitize data, to filter data, to analyze data, to combine data, to output command signals, and/or to process data in some other manner. Processing circuit 132 may be configured to perform digital-to-analog conversion (DAC), analog-to-digital conversion (ADC), modulation, demodulation, encoding, decoding, encryption, decryption, etc. Processing circuit 132 (e.g. an applications microprocessor 126) may be configured to execute various software programs such as application programs and system programs to provide computing and processing operations for device 10.

Processing circuit 132 may also include a memory that stores data. Processing circuit may include only one of a type of component (e.g. one microprocessor), or may contain multiple components of that type (e.g. multiple microprocessors). Processing circuit 132 could be composed of a plurality of separate circuits and discrete circuit elements. In some embodiments, processing circuit 132 will essentially comprise solid state electronic components such as a microprocessor (e.g. microcontroller). Processing circuit 132 may be mounted on a single board in a single location or may be spread throughout multiple locations which cooperate to act as processing circuit 132. In some embodiments, processing circuit 132 may be located in a single location (e.g. in proximity and/or on a common circuit carrying element such as a circuit board) and/or all the components of processing circuit 132 will be closely connected.

Components shown as part of a single processing circuit 132 in the figures may be parts of separate processing circuits in various embodiments covered by the claims unless limited by the claim to a single processing circuit (e.g. location circuit 124 may be part of a separate assembly having a separate microprocessor that interfaces with processing circuit 132 through data port 140).

Hand-held device 10 may also include a network transceiver 144. Transceiver 144 may operate using one or more of a LAN standard, a WLAN standard, a Bluetooth standard, a Wi-Fi standard, an Ethernet standard, and/or some other standard. Network transceiver 144 may be a wireless transceiver such as a Bluetooth transceiver and/or a wireless Ethernet transceiver. Wireless transceiver 144 may operate using an IEEE 802.11 standard. Hand-held device 10 may also include an external device connector 140 (such as a serial data port) for transferring data. External device connector 140 may also serve as the connector 152 to an external power supply. Hand-held device may contain more than one of each of transceiver 144 and external device connector 140. For example, network transceiver 144 may include both a Bluetooth and an IEEE 802.11 transceiver.

Network transceiver 144 may be arranged to provide voice and/or data communications functionality in accordance with different types of wireless network systems. Examples of wireless network systems may include a wireless local area network (WLAN) system, wireless metropolitan area network (WMAN) system, wireless wide area network (WWAN) system, and so forth. Examples of wireless network systems offering data communication services may include the Institute of Electrical and Electronics Engineers (IEEE) 802.xx series of protocols, such as the IEEE 802.11a/b/g/n series of standard protocols and variants (sometimes referred to as "WiFi"), the IEEE 802.16 series of standard protocols and variants (sometimes referred to as "WiMAX"), the IEEE 802.20 series of standard protocols and variants, and so forth.

Hand-held device 10 may be capable of operating as a mobile phone. The mobile phone may use transceiver 144 and/or may use a cellular transceiver 136. Cellular transceiver 136 may be configured to operate as an analog transceiver, a digital transceiver (e.g. a GSM transceiver, a TDMA transceiver, a CDMA transceiver), or some other type of transceiver. Cellular transceiver 136 may be configured to transfer data (such as image files) and may be used to access the Internet 142 in addition to allowing voice communication. Cellular transceiver 136 may be configured to use one or more of an EV-technology (e.g. EV-DO, EV-DV, etc.), an EDGE technology, a WCDMA technology, and/or some other technology.

Transceiver 144 may be arranged to perform data communications in accordance with different types of shorter range wireless systems, such as a wireless personal area network (PAN) system. One example of a wireless PAN system offering data communication services includes a Bluetooth system operating in accordance with the Bluetooth Special Interest Group (SIG) series of protocols, including Bluetooth Specification versions v1.0, v1.1, v1.2, v2.0, v2.0 with Enhanced Data Rate (EDR), etc. —as well as one or more Bluetooth Profiles, etc. Other examples may include systems using an infrared technique.

Cellular transceiver 136 may provide voice communications functionality in accordance with different types of cellular radiotelephone systems. Examples of cellular radiotelephone systems may include Code Division Multiple Access (CDMA) cellular radiotelephone communication systems, Global System for Mobile Communications (GSM) cellular radiotelephone systems, North American Digital Cellular (NADC) cellular radiotelephone systems, Time Division Multiple Access (TDMA) cellular radiotelephone systems, Extended-TDMA (E-TDMA) cellular radiotelephone systems, Narrowband Advanced Mobile Phone Service (NAMPS) cellular radiotelephone systems, third generation (3G) systems such as Wide-band CDMA (WCDMA), CDMA-2000, Universal Mobile Telephone System (UMTS) cellular radiotelephone systems compliant with the Third-Generation Partnership Project (3GPP), and so forth.

In addition to voice communications functionality, the cellular transceiver 136 may be arranged to provide data communications functionality in accordance with different types of cellular radiotelephone systems. Examples of cellular radiotelephone systems offering data communications services may include GSM with General Packet Radio Service (GPRS) systems (GSM/GPRS), CDMA/1xRTT systems, Enhanced Data Rates for Global Evolution (EDGE) systems, Evolution Data Only or Evolution Data Optimized (EV-DO) systems, Evolution For Data and Voice (EV-DV) systems, High Speed Downlink Packet Access (HSDPA) systems, High Speed Uplink Packet Access (HSUPA), and so forth.

Hand-held device 10 may include one or more user input devices 131 (e.g. button, switch, touch screen, keyboard, keypad, voice command circuit, etc.) for registering commands from a user on device 10. Some or all of user input devices 131 may interface with a switch control circuit (not shown) configured to interpret which switches have been actuated. User input device 131 may include an alphanumeric keyboard. The keyboard may comprise, for example, a QWERTY key layout and an integrated number dial pad. A keyboard integrated into a hand-held device would typically be a thumb keyboard. User input device 131 may also include various keys, buttons, and switches such as, for example, input keys, preset and programmable hot keys, left and right action buttons, a navigation button such as a multidirectional navigation button, phone/send and power/end buttons, preset and programmable shortcut buttons, a volume rocker switch, a ringer on/off switch having a vibrate mode, and so forth. Any of user input devices 131 may be concealable behind a body (e.g. a sliding body, a flip-out body, etc.) such that they are hidden when the body is in a first position and visible when the body is in the second position.

Hand-held device 10 may include one or more location determining circuits 124 (e.g. a GPS circuit and/or a cell-based location determining circuit) configured to determine the location of device 10. Device 10 may be configured to receive inputs from more than one location determining circuit 124. These inputs can be compared such that both are used, one (e.g. a cell-based system) can be used primarily when the other (e.g. GPS) is unable to provide reliable location information, or can have some other functional relationship.

Device 10 may use one or more different location determining techniques to derive the location of the device 10 based on the data from location determining circuit 124.

For example, device 10 may use one or more of Global Positioning System (GPS) techniques, Cell Global Identity (CGI) techniques, CGI including timing advance (TA) techniques, Enhanced Forward Link Trilateration (EFLT) techniques, Time Difference of Arrival (TDOA) techniques, Angle of Arrival (AOA) techniques, Advanced Forward Link Trilateration (AFTL) techniques, Observed Time Difference of Arrival (OTDOA), Enhanced Observed Time Difference (EOTD) techniques, Assisted GPS (AGPS) techniques, hybrid techniques (e.g., GPS/CGI, AGPS/CGI, GPS/AFTL or AGPS/AFTL for CDMA networks, GPS/EOTD or AGPS/EOTD for GSM/GPRS networks, GPS/OTDOA or AGPS/OTDOA for UMTS networks), and so forth.

Device 10 may be arranged to operate in one or more position determination modes including, for example, a standalone mode, a mobile station (MS) assisted mode, and/or a MS-based mode. In a standalone mode, such as a standalone GPS mode, the mobile computing device 10 may be arranged to autonomously determine its position without network interaction or support. When operating in an MS-assisted mode or an MS-based mode, however, device 10 may be arranged communicate over a radio access network (e.g., UMTS radio access network) with a position determination entity (PDE) such as a location proxy server (LPS) and/or a mobile positioning center (MPC).

In an MS-assisted mode, such as an MS-assisted AGPS mode, the PDE may be arranged to determine the position of the mobile computing device. In an MS-based mode, such as an MS-based AGPS mode, device 10 may be arranged to determine its position with only limited periodic assistance from the PDE. In various implementations, device 10 and the PDE may be arranged to communicate according a suitable MS-PDE protocol (e.g., MS-LPS or MS-MPC protocol) such as the TIA/EIA standard IS-801 message protocol for MS-assisted and MS-based sessions in a CDMA radiotelephone system.

When assisting device 10, the PDE may handle various processing operations and also may provide information to aid position determination. Examples of assisting information may include satellite-based measurements, terrestrial-based measurements, and/or system-based measurements such as satellite almanac information, GPS code phase measurements, ionospheric data, ephemeris data, time correction information, altitude estimates, timing offsets, forward/reverse link calibration, and so forth.

In various implementations, the assisting information provided by the PDE may improve the speed of satellite acquisition and the probability of a position fix by concentrating the search for a GPS signal and/or may improve the accuracy of position determination. Each position fix or series of position fixes may be available at device 10 and/or at the PDE depending on the position determination mode. In some cases, data calls may be made and assisting information may be sent to device 10 from the PDE for every position fix. In other cases, data calls may be made and assistance information may be sent periodically and/or as needed.

Hand-held device 10 may include one or more audio circuits 120 (e.g. speakers, microphone, etc.) for providing or receiving audio information to or from a user. In one example, hand-held device 10 includes a first speaker 120 designed for regular phone operation. Hand-held device 10 may also include a second speaker 120 for louder applications such as speaker phone operation, music or other audio playback (e.g. an mp3 player application), etc. Hand-held device 10 may also include one or more audio ports 120 (e.g. a headphone connector) for output to an external speaker and/or input from an external microphone. Audio circuit 120 may be under the control of one or more audio drivers 122 which may include D/A converters and/or an amplifier.

Hand-held device 10 may include a camera 112 for taking pictures using device 10. Camera 112 may include a CCD sensor, a CMOS sensor, or some other type of image sensor capable of obtaining an image (particularly, images sensors capable of obtaining an image formed as an array of pixels). The image sensor may have a resolution of at least about 65,000 pixels or at least about 1 megapixel. In some embodiments, the image sensor may have a resolution of at least about 4 megapixels. Camera 112 may also include read-out electronics for reading data from the image sensor. Image processing circuit 116 may be coupled to the camera 112 for processing an image obtained by the camera. This image processing may include format conversion (e.g. RGB to YCbCr), white balancing, tone correction, edge correction, red-eye reduction, compression, CFA interpolation, etc. Image processing circuit 116 may be dedicated hardware that has been optimized for performing image processing.

Hand-held device 10 may include a display 114 for displaying information to a user. Display 114 could be one or more of an LCD display (e.g. a touch-sensitive color thin-film transistor (TFT) LCD screen), an electroluminescent display, a carbon-nanotube-based display, a plasma display, an organic light emitting diode (OLED) display, and some other type of display. Display 114 may be a touch screen display such that a user may input commands by approaching (e.g. touching) display 114 (including touch screens that require a specialized device to input information). Display 114 may be a color display (e.g., 16 or more bit color display) or may be a non-color (e.g. monotone) display. Display 114 may be controlled by a display driver 118 that is under the control of a microprocessor 126. In some embodiments, display 114 may be used with a stylus. Display 114 may be used as an input to a handwriting recognizer application.

Hand-held device 10 may include a dedicated memory 134 fixed to device 10. Memory 134 may be implemented using any machine-readable or computer-readable media capable of storing data such as erasable or non-erasable memory, writeable or re-writeable memory, and so forth. Dedicated memory 134 may be a non-volatile memory, may be a volatile memory, or may include both volatile and non-volatile memories. Examples of machine-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information. In one embodiment, fixed memory 134 is a non-volatile memory.

Although the memory 134 is shown as being separate from and external to processing circuit 132 some portion or the entire memory 134 may be included on the same integrated circuit as processing circuit 132 (e.g. the same integrated circuit as microprocessor 126).

Hand-held device 10 may include a removable memory port 138 configured to receive a removable memory medium, and/or other components. Removable memory port 138 may also serve as an external device connector 140. For example, removable memory port may be an SDIO card slot which can be used to receive memory cards, receive cards input and/or output data, and combined cards having both memory and input/output functions.

Memory 134 and/or memory 138 may be arranged to store one or more software programs to be executed by processing circuit 132.

Dedicated memory 134 and removable memory 138 may be connected to and/or under the control of a common memory controller 128 such as a non-volatile memory controller. Memory controller 128 may be configured to control reading of data to and writing of data from dedicated memory 134 and/or removable memory 138.

Handheld device 10 may be configured to connect to one or more servers 146,148 via a network 142 (such as the Internet) using one or more of network transceiver 144, cellular transceiver 136, and external device connector 140.

Hand-held device 10 may also include a power supply circuit 152 configured to regulate power supply in hand-held device 10. Power supply circuit 152 may be configured to do one or more of control charging of battery 156, to communicate the amount of power remaining in battery 156, determine and/or communicate whether an external power supply is connected, switch between the external power supply and the battery, etc. Battery 156 may be a rechargeable battery and may be removable or may be fixed to device 10. Battery 156 may be formed from any number of types of batteries including silver-based batteries (e.g. silver-zinc, magnesium-silver-chloride, etc.), a lithium-based battery (e.g. lithium-ion, lithium-polymer, etc.), a nickel-based battery (nickel-cadmium, nickel-metal-hydride, etc.), zinc-based batteries (e.g. silver-zinc, carbon-zinc, etc.), etc. External power supply connector 134 may be configured to be connected to a direct current source, an alternating current source, or both DC and AC sources.

Device 10 may have an optical viewfinder (not shown), may use display 114 as a digital viewfinder, may include some other type of view finder, may include multiple types of view finders, or may not include a view finder.

Device 10 may be configured to connect to the Internet 142, which may be a direct connection (e.g. using cellular transceiver 136, external device connector 140, or network transceiver 144) or may be an indirect connection (e.g. routed through external device 150). Device 10 may receive information from and/or provide information to the Internet. Device 10 may include a web browser configured to display information received from the Internet (including information which may be optimized by the browser for display on portable device 10). Device 10 may connect to one or more remote servers 146,148 using the Internet. Device 10 could also connect to another personal electronic device 150 by way of the Internet.

Device 10 may comprise an antenna system (not illustrated) for transmitting and/or receiving electrical signals. Each of the transceivers 136,144 and/or location circuit 124 may include individual antennas or may include a common antenna system. The antenna system may include or be implemented as one or more internal antennas and/or external antennas.

Portable device 10 may comprise a subscriber identity module (SIM) coupled to processing circuit 132. The SIM may comprise, for example, a removable or non-removable smart card arranged to encrypt voice and data transmissions and to store user-specific data for allowing a voice or data communications network to identify and authenticate the user. The SIM may store data such as personal settings specific to the user.

Referring to FIG. 3, device 10 and/or processing circuit 132 may be configured to run any number of different types of applications. Examples of application programs may include, for example, a phone application 230 (e.g. a telephone application, a voicemail application, a VoIP application, etc.), a messaging application 202 (e.g. an e-mail application, an instant message (IM) application, a short message service (SMS) application, a multimedia message service (MMS) application), a web browser application 228, a personal setting application 210 (e.g. a personal information manager (PIM) application), a contact management application 218, a calendar application 216 (e.g. a calendar application, a scheduling application, etc.), a task management application 222, a document application (e.g. a word processing application, a spreadsheet application, a slide application, a document viewer application, a database application, etc.), a location application 214 (e.g. a positioning application, a navigation application, etc.), an image application 212 (e.g. a camera application such as a digital camera application and/or a video camera application, an image management application, etc.) including media player applications (e.g. a video player application, an audio player application, a multimedia player application, etc.), a gaming application, a handwriting recognition application, and so forth. The application software may provide a graphical user interface (GUI) to communicate information between the portable device 10 and a user.

Device 10 may include a location application 214. Location application 214 may be configured to calculate the current position (e.g. the rough current position) of device 10 based on data received from one or more location determining circuits 124. Location application 214 may be provided with map information such that it can translate coordinate positions into map positions (and vice versa). Location application 214 may be configured to provide navigational information to a user such as turn by turn directions.

Device 10 may include personal organizer applications such as a calendar application 216, a contacts application 218, and a task application (not illustrated). Calendar application 216 may allow a user to schedule events, set alarms for events, and store a wide variety of information for events (e.g. name of the event, location of the event, other attendees of the event, etc.). Contacts application 218 may allow a user to save contact information for a contact such as phone number information (which may be shared with a phone application 230), address information, group information (e.g. which user created group or groups the contact belongs to), and other information about the contact. The task application allows a user to keep track of pending and/or completed tasks.

Device 10 may include an internal clock application 224 that keeps track of time information (such as current time of day and/or date), time zone information, daylight savings time information, etc. Clock application 224 may be a program running based on data from an internal clock of microprocessor 126, data from a separate clock/timing circuit, or data from some other circuit.

Device 10 may also include one or more network connection protocol applications 226 that allow a user to transfer data over one or more networks. Network application 226 may be configured to allow device 10 to access a remote device such as server 146,148.

Device 10 may include an Internet browser application 228 that allows a user to browse the internet. The Internet browser application may be configured to alter the data received from Internet sites so that the data can be easily viewed on portable device 10.

Device 10 may include a phone application 230 configured to allow a user to make phone calls. Phone application 230 may use contact information from contact application 218 to place phone calls.

Device 10 may also include one or more messaging applications 202 that allow a user to send and/or receive messages such as text messages, multi-media messages, e-mails, etc. E-mail messages may come from a server which may use a Push technology and/or may use a pull technology (e.g. POP3, IMAP, etc.).

Any of the information discussed above for any of the applications (e.g. applications 202-228) may be added to or otherwise associated with an image file.

Referring to FIGS. 1-2, a hand-held portable computing device 10 (e.g. a mobile computing device such as a smartphone) includes a number of user input devices 131. The user input devices include a send button 4 configured to select options appearing on display 3 and/or send messages, a 5-way navigator 5 configured to navigate through options appearing on display 3, a power/end button 6 configured to select options appearing on display 3 and to turn on display 3, a phone button 7 usable to access a phone application screen, a calendar button 8 usable to access a calendar application screen, a messaging button 9 usable to access a messaging application screen, an applications button 60 usable to access a screen showing available applications, a thumb keyboard 11 (which includes a phone dial pad 12 usable to dial during a phone application), a volume button 19 usable to adjust the volume of audio output of device 10, a customizable button 20 which a user may customize to perform various functions, a ringer switch 22 usable to switch the smartphone from one mode to another mode (such as switching from a normal ringer mode to a meeting ringer mode), and a touch screen display 3 usable to select control options displayed on display 3. Touch screen display 3 is also a color LCD display 114 having a TFT matrix.

Smartphone 10 also includes audio circuits 120. The audio circuits 120 include phone speaker 2 usable to listen to information in a normal phone mode, external speaker 16 louder than the phone speaker (e.g. for listening to music, for a speakerphone mode, etc.), headset jack 23 to which a user can attach an external headset which may include a speaker and/or a microphone, and microphone 25 which can be used to pick up audio information such as the user's end of a conversation during a phone call.

Smartphone 10 also includes a status indicator 1 that can be used to indicate the status of Smartphone 10 (such as messages pending, charging, low battery, etc.), a stylus slot 13 for receiving a stylus such as a stylus usable to input data on touch screen display 3, a digital camera 15 (see camera 112) usable to capture images, a mirror 14 positioned proximate camera 15 such that a user may view themselves in mirror 14 when taking a picture of themselves using camera 15, a removable battery 18 (see battery 156), and a connector 24 (see external data connector 140 and external power supply 134) which can be used to connect device 10 to either (or both) an external power supply such as a wall outlet or battery charger or an external device such as a personal computer, a gps unit, a display unit, or some other external device.

Smartphone 10 also includes an expansion slot 21 (see removable memory 138) which may be used to receive a memory card and/or a device which communicates data through slot 21, and a SIM card slot 17, located behind battery 18, configured to receive a SIM card or other card that allows the user to access a cellular network.

In various embodiments device 10 may include a housing 40. Housing 40 could be any size, shape, and dimension. In some embodiments, housing 40 has a width 52 (shorter dimension) of no more than about 200 mm or no more than about 100 mm. According to some of these embodiments, housing 40 has a width 52 of no more than about 85 mm or no more than about 65 mm. According to some embodiments, housing 40 has a width 352 of at least about 30 mm or at least about 50 mm. According to some of these embodiments, housing 40 has a width 52 of at least about 55 mm.

In some embodiments, housing 40 has a length 54 (longer dimension) of no more than about 200 mm or no more than about 150 mm. According to some of these embodiments, housing 40 has a length 54 of no more than about 135 mm or no more than about 125 mm. According to some embodiments, housing 40 has a length 54 of at least about 70 mm or at least about 100 mm. According to some of these embodiments, housing 40 has a length 54 of at least about 110 mm.

In some embodiments, housing 40 has a thickness 50 (smallest dimension) of no more than about 150 mm or no more than about 50 mm. According to some of these embodiments, housing 40 has a thickness 50 of no more than about 30 mm or no more than about 25 mm. According to some embodiments, housing 40 has a thickness 50 of at least about 10 mm or at least about 15 mm. According to some of these embodiments, housing 40 has a thickness 50 of at least about 50 mm.

While described with regards to a hand-held device, many embodiments are usable with portable devices which are not handheld and/or with non-portable devices/systems.

The various single applications discussed above may be performed by multiple applications where more than one application performs all of the functions discussed for the application or where one application only performs some of the functions discussed for the application. For example, the image application 212 may be divided into an image capturing application and a separate image viewing application. Also, more than one application may be included on device 10 that is capable of displaying images as described for image application 212.

Further, while shown as separate applications above, many of the above listed applications can be combined into single applications that perform all or some of the functions listed for more than one of the applications discussed above.

While some components in FIG. 2 were discussed as being singular and others were discussed as being plural, the invention is not limited to devices having these same numbers of each type of component. Embodiments are conceived where each combination of plural and singular components exist.

In some embodiments, the various components shown in FIG. 2 may be combined in a single component. For example, in some embodiments, removable memory 138 may also be an external device connector 140 (such as an SDIO card slot which can be used to receive memory cards, input and/or output data, and combined devices having both memory and input/output functions). As another example, in some embodiments, a single connector could serve as both an external device connector 140 and as a connection to an external power supply 134.

Also, in some embodiments, the function of various claim components shown in FIG. 2 may be performed by a combination of distinct electrical components. For instance, a location determining circuit 124 may have a separate microprocessor that works in combination with the main microprocessor 126 of the system to perform the functions of the processing circuit 132. As another example, image processing circuit 116 may make use of the electronics of camera 112 to perform image processing, while also having other, discrete electronic components.

While the discussion above was generally directed to "future tasks"—tasks entered more than a quarter hour prior to their contemplated completion or taking action towards completing (e.g. not immediately routed to)—the features discussed above may be applied to any tasks, including tasks not meeting the criteria for future tasks (i.e. present tasks) such as immediate tasks (tasks to be completed or to have action taken on immediately when entered). However, in most (although not all) contemplated embodiments, the system performing the function is configured to permit any one or more of the above-described functions to be carried out on future tasks.

Additionally, while some discussion was made above relating to websites, it is equally contemplated that the features relating to websites could be applied to any other network-accessible data system (e.g. some other network-accessible information retrieval system such as a network-accessible database system).

What is claimed is:

1. A method comprising:
   storing, in a mobile computing device, user-defined names associated with locations, wherein the mobile computing device comprises a smart phone;
   receiving data indicative of a current location of the mobile computing device;
   determining whether the current location, received by the mobile computing device, is associated with a single user-defined name or multiple user-defined names, the multiple user-defined names comprise a plurality of generic names for the current location associated by a user;
   prompting for a selection from multiple user-defined names when the current location is associated with multiple user-defined names; and
   providing, to a recipient, a user-defined name associated with the current location when the current location is associated with the single user-defined name or a selected user-defined name from among those associated with the current location when the current location is associated with multiple user-defined names.

2. The method of claim 1, the providing, to a recipient, a user-defined name and a selected user-defined name comprising:
providing the user-defined name or the selected user-defined name to a server to be published on a web page.

3. The method of claim 2, comprising receiving data indicative of information that a user can use to access the web page,
the providing a user-defined name comprising publishing the user-defined name using the data indicative of information that the user can use to access the web page; and
the providing a selected user-defined name comprising publishing the selected user-defined name using the data indicative of information that the user can use to access the web page.

4. The method of claim 1,
the providing a user-defined name comprising entering text of the user-defined name into a field provided by a web page for entering text; and
the providing a selected user-defined name comprising entering text of the selected user-defined name into the field provided by the web page for entering text.

5. The method of claim 4, wherein the field is not a field dedicated to entering location information.

6. The method of claim 1, comprising receiving user input representative of the user-defined names associated with the locations.

7. The method of claim 6, the receiving user input comprising receiving contact information in a contacts application on the mobile computing device.

8. The method of claim 1, the storing user-defined names comprising storing a plurality of user-defined names with a single location.

9. The method of claim 1, wherein the selected user-defined name is based on at least one criteria including: a user selected name, a publishing web page, a priority, a user preference, a time, or a date.

10. A method comprising:
receiving, on a user input device, data representative of user-defined names associated with locations;
storing, in a mobile computer device, the user-defined names associated with locations, wherein the mobile computer device comprises a smart phone;
receiving data indicative of a current location of the mobile computing device;
determining whether the current location, received by the mobile computing device, is associated with a single user-defined name or with multiple user-defined names, the multiple user-defined names comprise a plurality of generic names for the current location associated by a user;
prompting for a selection from multiple user-defined names when the current location is associated with multiple user-defined names; and
publishing, to a web site, a user-defined name associated with the current location when the current location is associated with the single user-defined name, or a selected user-defined name from among those associated with the current location when the current location is associated with multiple user-defined names.

11. The method of claim 1, comprising publishing, to a web site, information indicative of the fact that the current location is not associated any of the user-defined names.

12. The method of claim 1, the receiving data comprising receiving data from a location determining circuit of the mobile computing device.

13. The method of claim 1, comprising determining whether the current location is in proximity to a location associated with any of the user-defined names.

14. The method of claim 13, wherein being in proximity to the location associated with user-defined names requires that the current location be within a predetermined distance of the location.

15. The method of claim 1, the storing user-defined names comprising a free-form user-defined name.

16. The method of claim 10 wherein the multiple user-defined names enable one generic name to be published to the website and a different generic name to be published to a different website.

17. The method of claim 16, the receiving data comprising receiving data from a positioning circuit of the mobile computing device.

* * * * *